US011952803B1

(12) United States Patent
Kelsch et al.

(10) Patent No.: US 11,952,803 B1
(45) Date of Patent: *Apr. 9, 2024

(54) ANTI-THEFT DEVICE WITH ADJUSTABLE LOCKING ARMS FOR SECURING AN ARTICLE OF MERCHANDISE

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); John N. Figh, Jr., Oldsmar, FL (US); Matthew Kuntz, Tampa, FL (US); Lucas P. Swartwood, Los Gatos, CA (US); Wade Zhu, Westchase, FL (US); Volodymyr Andreev, Lviv (UA); Peter D. Iezzi, Coral Springs, FL (US); Andriy Los, Lviv (UA); Jasen Paul Biggins, Tampa, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 416 days.

This patent is subject to a terminal disclaimer.

(21) Appl. No.: 17/331,217

(22) Filed: May 26, 2021

Related U.S. Application Data

(63) Continuation-in-part of application No. 17/081,468, filed on Oct. 27, 2020, now Pat. No. 11,035,151, (Continued)

(51) Int. Cl.

*E05B 73/00* (2006.01)
*E05B 47/00* (2006.01)

(52) U.S. Cl.

CPC ...... *E05B 73/0082* (2013.01); *E05B 47/0001* (2013.01); *E05B 73/0017* (2013.01); *E05B 73/0023* (2013.01); *E05B 2047/002* (2013.01)

(58) Field of Classification Search

CPC ....... E05B 2047/002; E05B 2047/0021; E05B 2047/0022; E05B 53/008; E05B 73/00;

(Continued)

(56) References Cited

U.S. PATENT DOCUMENTS 5,715,711 A 2/1998 Jennison
6,237,375 B1 * 5/2001 Wymer ............... E05B 73/0082 70/58

(Continued)

*Primary Examiner* — Christopher J Boswell

(74) *Attorney, Agent, or Firm* — Andriy Lytvyn; Hill Ward Henderson, P.A.

(57) ABSTRACT

An anti-theft device for securing an article of merchandise against unauthorized removal from a display counter. The anti-theft device includes a plurality of arms slidingly disposed within the housing. Grips are disposed on proximal ends of the arms and are configured to receive and secure edges of an article of merchandise. A locking mechanism is disposed within the housing of the anti-theft device. The locking mechanism involves an actuator that presses a locking component to engage at least one of the arms. The arms have a first set of teeth disposed thereon, such that, when the locking component engages at least one of the arms, the first set of teeth interlocks with a second set of teeth. The arms cannot slide relative to the housing while the first set of teeth and the second set of teeth remain interlocked.

21 Claims, 25 Drawing Sheets

Related U.S. Application Data which is a continuation-in-part of application No. 16/458,967, filed on Jul. 1, 2019, now Pat. No. 10,858,865, which is a continuation-in-part of application No. 16/050,696, filed on Jul. 31, 2018, now Pat. No. 10,378,248.

(58) Field of Classification Search
CPC ............. E05B 73/0017; E05B 73/0023; E05B 73/0029; E05B 73/0082; F16H 27/02
See application file for complete search history.

(56) References Cited

U.S. PATENT DOCUMENTS

| | | | | |
|---|---|---|---|---|
| 8,464,563 | B2 * | 6/2013 | Perez | E05B 73/0023 70/57.1 |
| 8,711,553 | B2 * | 4/2014 | Trinh | E05B 73/0082 361/679.02 |
| 9,161,466 | B2 | 10/2015 | Huang | |
| 9,334,679 | B2 * | 5/2016 | Lin | E05B 73/0082 |
| 9,797,543 | B2 * | 10/2017 | Lin | E05B 73/0082 |
| 10,001,153 | B1 * | 6/2018 | Fan | F16M 13/00 |
| 10,378,248 | B1 | 8/2019 | Kelsch et al. | |
| 10,858,865 | B2 | 12/2020 | Kelsch et al. | |
| 2010/0079285 | A1 * | 4/2010 | Fawcett | E05B 73/0082 70/57.1 |
| 2012/0312936 | A1 | 12/2012 | Huang | |
| 2015/0129724 | A1 | 5/2015 | Kohmoto et al. | |
| 2016/0201359 | A1 | 7/2016 | Berglund et al. | |
| 2017/0206757 | A1 | 7/2017 | Grant et al. | |

* cited by examiner

ANTI-THEFT DEVICE WITH ADJUSTABLE LOCKING ARMS FOR SECURING AN ARTICLE OF MERCHANDISE

CROSS-REFERENCE TO RELATED APPLICATIONS

This application is a continuation-in-part of and claims priority to the nonprovisional application Ser. No. 17/081,468, filed on Oct. 27, 2020, which is a continuation-in-part of and claims priority to the nonprovisional application Ser. No. 16/458,967, filed on Jul. 1, 2019, which is a continuation-in-part of and claims priority to nonprovisional application Ser. No. 16/050,696, filed on Jul. 31, 2018.

BACKGROUND OF THE INVENTION

1. Field of the Invention

This invention relates to merchandise anti-theft devices. More specifically, it relates to an anti-theft device having adjustable arms and a locking mechanism for securing an article of merchandise against unauthorized removal from a display counter.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma pertaining to how to interactively display their merchandise to attract customers and increase sales, while, at the same time, safeguarding the merchandise against theft.

Several anti-theft devices are currently known in the art, but they have serious flaws. One example of an existing anti-theft device is disclosed in a published PCT application WO 2011/032147. The device includes a housing that attaches to the back cover of the gadget via an adhesive layer. Two arms extend laterally from the housing and grasp the opposite edges of the gadget, thereby securing it within the clamp. This anti-theft device, however, has a serious flaw: many electronic gadgets have removable back covers, which makes them vulnerable to theft because thieves can easily circumvent this anti-theft device by simply removing the back cover of the gadget and sliding the gadget out of the grasping arms. This flaw significantly undermines the efficacy of this device rendering it inadequate for many electronic gadgets.

Other currently available anti-theft solutions involve obtrusive and aesthetically unattractive devices such as steel cables, locks, and casings. Although these security measures may effectively protect against theft, they have a negative effect on the consumers by discouraging interaction with products and may ruin the overall ambiance of a retail store. Accordingly, there exists an unresolved need for a discrete and effective anti-theft device that adequately secures an electronic gadget while allowing the prospective purchasers to fully experience the gadget without obstructing access to any of the gadget's functional features, including the front screen.

SUMMARY OF THE INVENTION

The invention pertains to an anti-theft security device having a housing and a plurality of arms slidingly connected thereto. The arms have grips configured to receive edges (i.e., straight edges and/or corners) of an article of merchandise. At least one of the arms is independently adjustable by sliding in and out relative to the housing of the anti-theft device. The movable arms have a plurality of teeth disposed thereon.

The security device has a locking component movingly disposed within the housing. The locking component has a first disengaged position, in which the locking component is retracted away from the movable arms. When the locking component is in the first disengaged position, the arms are free to slide with respect to the housing. By sliding the arms relative to the housing, a user can adjust the distances between the grips to accommodate the geometry of the article of merchandise.

The locking component has a second engaged position, in which the locking component applies a force onto one or more arms. The force applied by the locking component onto the arms causes the teeth disposed along the arms to interlock with a complementary set of teeth disposed either on the locking component or within the housing. When the teeth are interlocked in this manner, the arms are immobilized relative to the housing, and the anti-theft device is in its locked configuration.

A first mechanical element is disposed within the housing. The first mechanical element has a first configuration, in which it is configured to immobilize the locking component. The first mechanical element also has a second configuration in which the first mechanical element releases the locking component, thereby enabling the locking component to retract away from the arms. When the locking component is retracted away from the arms, the teeth disposed along the arms disengage the complementary set of teeth, thereby releasing the arms to slide inwardly or outwardly with respect to the housing. When the anti-theft device is in the unlocked configuration, the article of merchandise can be removed therefrom or placed therein, and, when the anti-theft device is in its locked configuration, the arms/grips of the anti-theft device immobilize the article of merchandise relative to the housing of the anti-theft device.

The first mechanical element can be an actuator screw-threadedly disposed within the housing. In this embodiment, rotation of the first mechanical element about a longitudinal center axis thereof transitions the first mechanical element between the first configuration, in which the first mechanical element immobilizes the locking component, and the second configuration, in which the first mechanical element releases the locking component. In an embodiment, the first mechanical element is biased toward the first configuration.

In an embodiment, the arms can be positioned within different planes, such that one of the arms is positioned below another arm relative to the top surface of the housing. In an embodiment, three or more arms can be stacked on top of one another, and the locking component is configured to simultaneously engage multiple stacked arms, thereby immobilizing them against movement relative to the housing.

In an embodiment, at least some of the arms are coplanar relative to the top surface of the housing. In this embodiment, the teeth of the coplanar arms are configured to interlock with one another when the locking component is in its engaged position.

In an embodiment, the locking teeth have sloped sides, such that when the two sets of teeth interlock, the arms are driven inwardly relative to the housing.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1A:
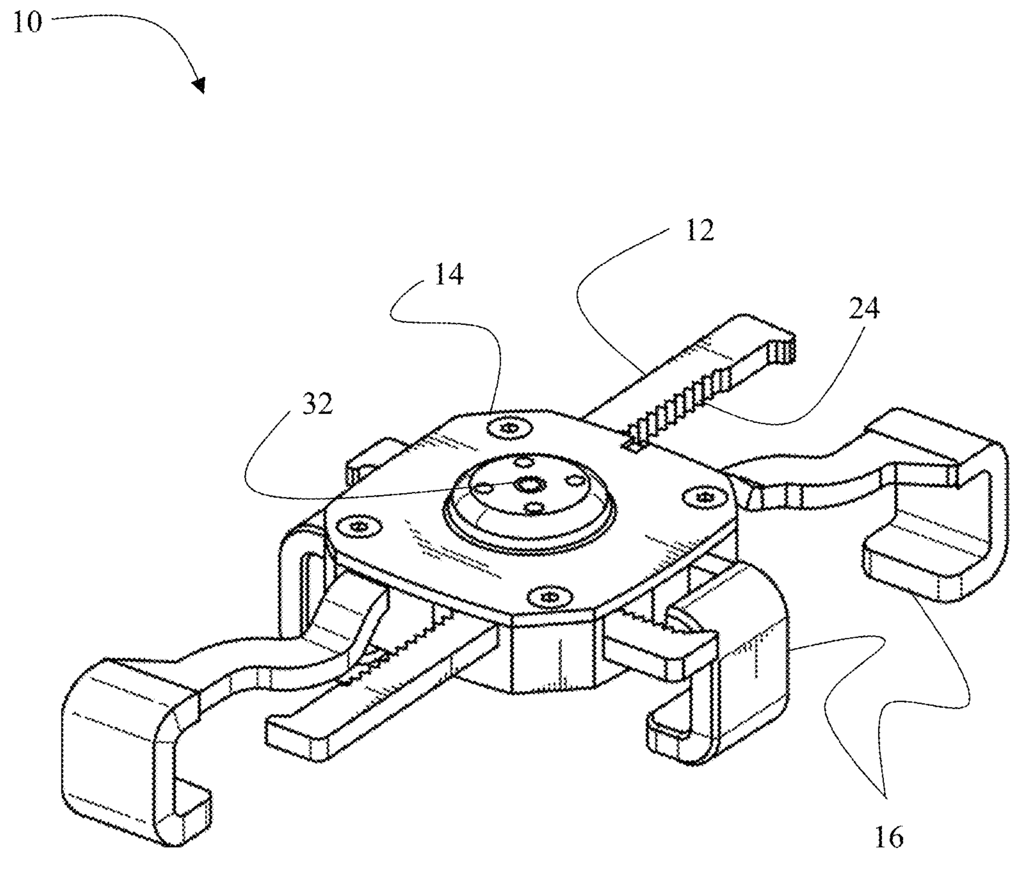
FIG. 1A is a perspective view of the anti-theft device.
Figure 1B:
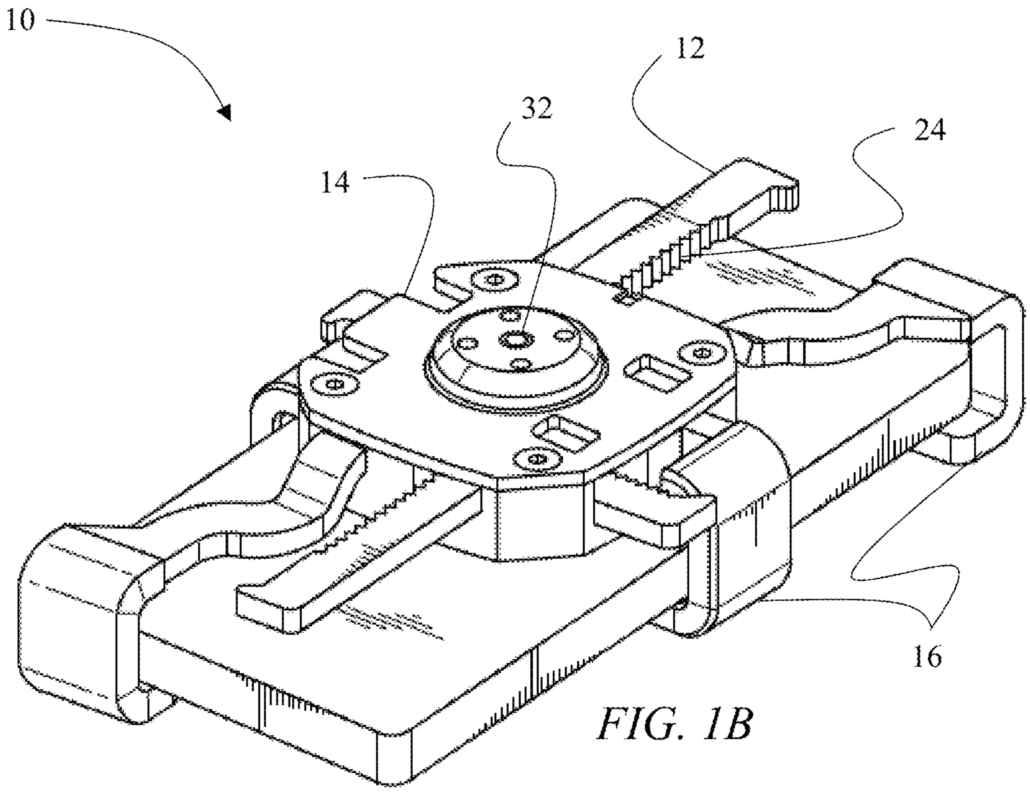
FIG. 1B is a perspective view of the anti-theft device securing an article of merchandise.

FIGS. 1A-B depict an anti-theft security device 10. Security device 10 has two sets of adjustable bracket arms 12 disposed within a housing 14. The distal end of each arm 12 has a C-shaped grip 16 configured to receive an edge of an article of merchandise. The two sets of adjustable arms 12 are in an orthogonal relationship with one another. The length of each arm 12 is independently adjustable by sliding arm 12 relative to housing 14. This configuration enables arms 12 to adjust to the geometry of the article of merchandise.

Referring to FIGS. 1A-B, the following is a description of the method of securing the article of merchandise within security device 10 and, subsequently, releasing the article of merchandise therefrom. When unlocked, arms 12 are configured to slide in a direction away from housing 14, thereby increasing a distance between opposite grips 16. When the distance between opposite grips 16 exceeds the dimensions of the article of merchandise, the article of merchandise can be positioned between grips 16. At this point, arms 12 can be manipulated to slide toward one another, thereby decreasing the distance between opposite grips 16 until they engage the edges of the article of merchandise. In this configuration, the article of merchandise is secured to housing 14 by grips 16. To release the article of merchandise from housing 14, arms 12 are manipulated to slide outward from housing 14, thereby increasing the distances between opposite grips 16. Once the distance between opposite grips 16 exceeds the dimensions of the article of merchandise, the article of merchandise can be removed from security device 10.

As depicted in FIG. 1A, in an embodiment the proximal end of each arm 12 has flange 48 that prevents arms 12 from completely sliding out of housing 14. Arms 12 are slidingly disposed within corresponding channels inside housing 14. The width of each channel is such that it exceeds the width of the arm but is less than the combined width of the arm and flange 48. Thus, flanges 48 secure arms 12 against removal from housing 14. Each arm 12 can slide a predetermined distance relative to housing 14. This distance is controlled by the length of the channels: when flanges 48 engage the entryway of the channel arms 12 cannot slide outwardly any further because flanges 48 cannot enter into the channels. This feature secures arms 12 inside housing 14, thus preventing arms 12 from becoming lost or misplaced and facilitating ease of operation by ensuring that arms 12 do not accidentally slide out of housing 14 during the process of securing the article of merchandise within security device 10.

To ensure that arms 12 cannot be manipulated by an unauthorized individual, security device 10 includes a locking mechanism 20, depicted in FIGS. 2A-2D. Arms 12 are disposed within housing 14 in an orthogonal relationship with one another, such that each longitudinal arm 12 overlaps two latitudinal arms 12. This configuration results in a rectangle being formed between overlapping arms 12, wherein the rectangle is defined by inner edges of arms 12. Each inner edge has a rack of gear teeth 24 disposed therealong.

Figure 2A:
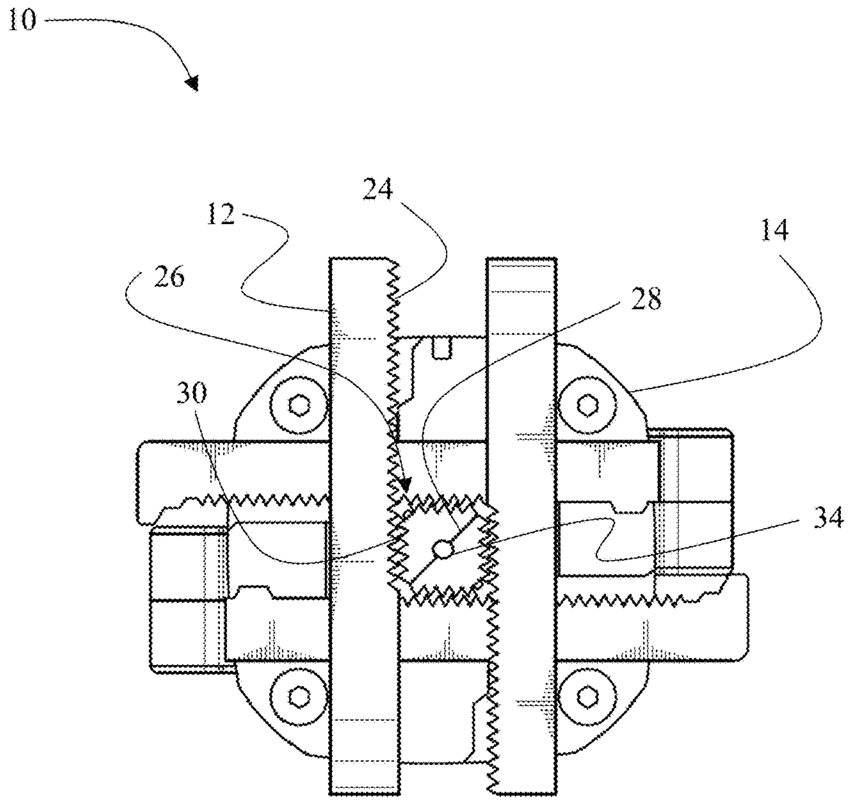
FIG. 2A is a top view of an embodiment of the anti-theft device in an unlocked configuration.
Figure 2B:
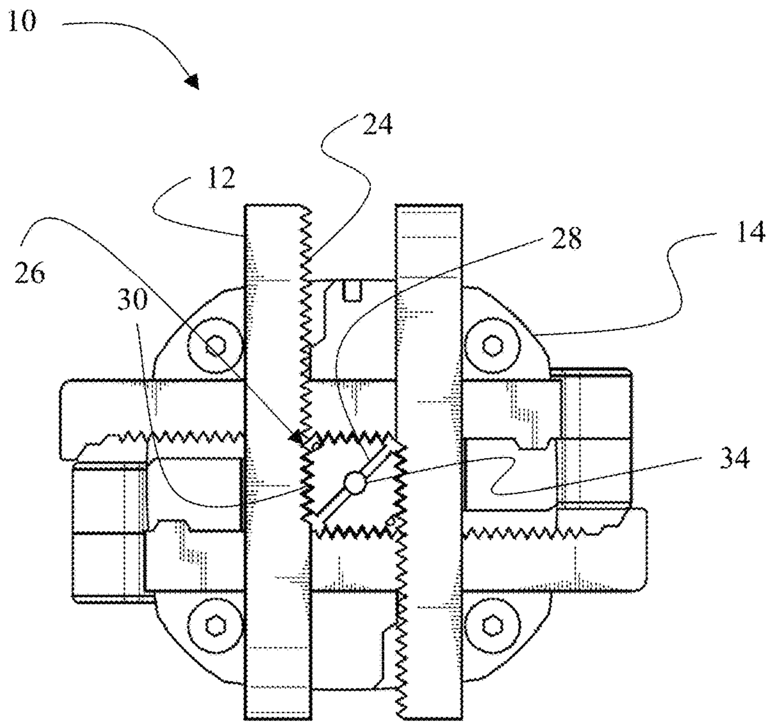
FIG. 2B is a top view of an embodiment of the anti-theft device in a locked configuration.
Figure 2C:
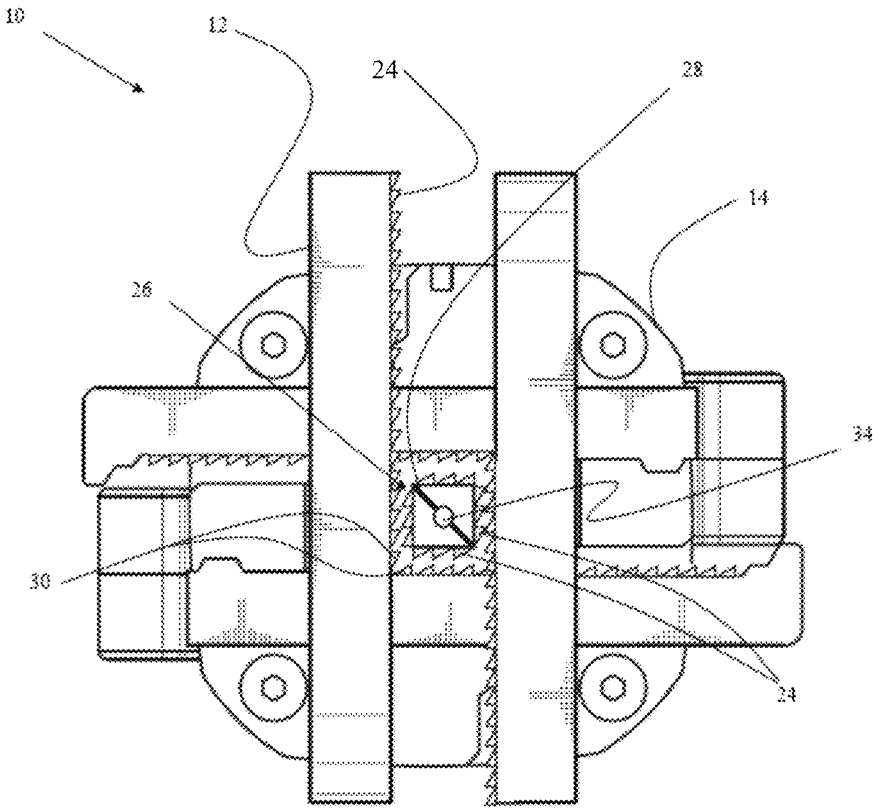
FIG. 2C is a top view of an embodiment of the anti-theft device in an unlocked configuration.
Figure 2D:
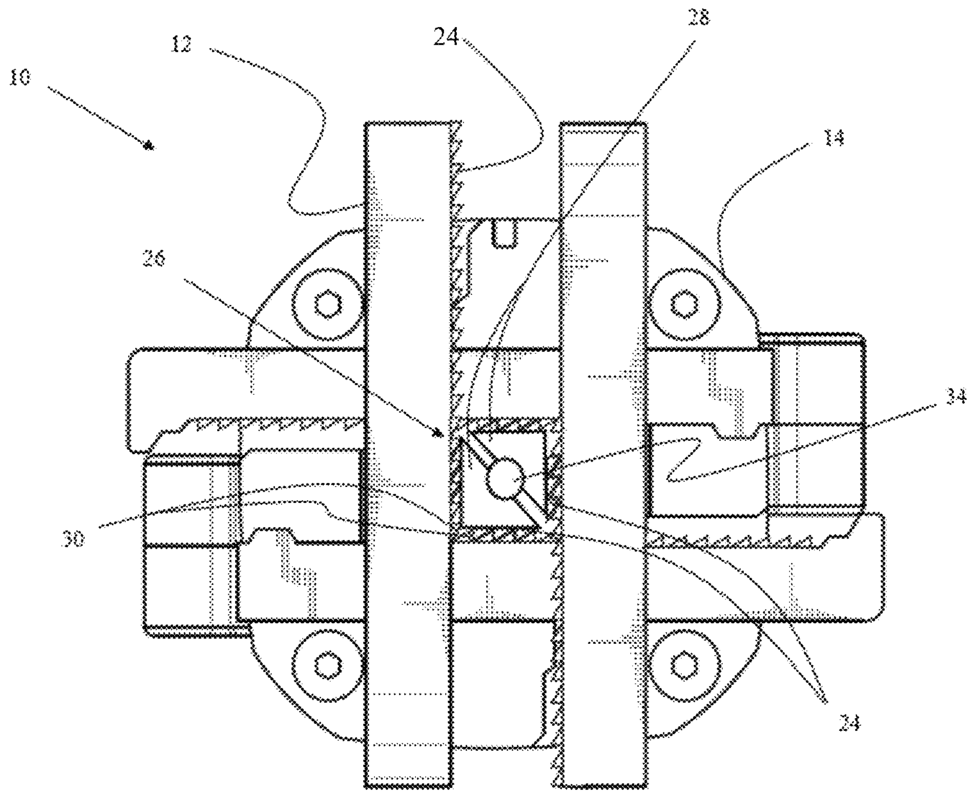
FIG. 2D is a top view of an embodiment of the anti-theft device in a locked configuration.

In an embodiment depicted in FIGS. 2C and 2D, gear teeth 30 and gear teeth 24 have right-triangular shapes with sloping sides. During the locking process, gear teeth 24 of locking components 28 apply forces onto sloping sides of gear teeth 30 of arms 12, thereby causing arms 12 to further slide inwardly relative housing 14. The geometries of the sloping sides of gear teeth 24 and 30 ensure that, when transitioning from an unlocked configuration to a locked configuration, arms 12 always slide inwardly relative to housing 14, thus causing grips 16 of arms 12 to securely grasp the edges of the article of merchandise. Gear teeth 30 and gear teeth 24 may be any geometric shape and/or different geometric shapes that one in the art would appreciate causing arms 12 to slide further toward housing 14 when gear teeth 30 engage gear teeth 24, securing the article of manufacture within security device 10.

As depicted in FIGS. 2A-2D, locking mechanism 20 is disposed within housing 14 inside the rectangle formed by overlapping bracket arms 12. Locking mechanism 26 comprises two locking components 28. Each locking component 28 has a right-triangular shape with a plurality of gear teeth 30 disposed along the legs of the right triangle. Gear teeth 30 are configured to interlock with gear teeth 24.

Locking components 28 are configured to transition between an unlocked configuration depicted in FIG. 2A into a locked configuration depicted in FIG. 2B. In the unlocked configuration, hypotenuse sides of two locking components 28 are in a close proximity or in an abutting relation with respect to one another. In this configuration, gear teeth 30 are disengaged from gear teeth 24, and, therefore, arms 12 are free to slide outwardly with respect to housing 14.

In the locked configuration, depicted in FIGS. 2B and 2D, locking components 28 are moved away from one another. In this configuration, gear teeth 30 of locking components 28 engage gear teeth 24 of arms 12. Because arms 12 in an orthogonal orientation with respect to one another, and because gear teeth 30 are disposed in a right-angle arrangement along the edges of the locking components 26, each locking component 28 is configured to simultaneously engage two arms 12. Thus, in the locked configuration, gear teeth 30 of two locking components 28 engage gear teeth 24 of all four arms 12. In this configuration, arms 12 are immobilized because interlocking of gear teeth 30 and gear teeth 24 restricts arms 12 against movement relative to housing 14. Therefore, when the article of merchandise is secured within grips 16, and security device 10 is in its locked configuration, the article of merchandise cannot be removed from grips 16 until locking components 28 are retracted, thereby releasing arms 12.

FIGS. 3A-C and 4A-B illustrate the mechanism and method of transitioning locking mechanism 24 between the locked and unlocked configurations. Housing 14 includes a port 32 disposed directly above the line at which hypotenuse edges of locking components 28 meet. An actuator 34 is disposed within the port 32. Actuator 34 is configured to translate along a vertical center axis of port 32, whereby actuator 34 can move in a downward direction toward locking components 28, and in an upward direction away from locking components 28. In an embodiment, port 32 and actuator 34 have complementary threads, whereby actuator 34 can be translated along the center axis of port 32 by clockwise or counterclockwise rotation. In other embodiments, various means known in the art for achieving a connection between a female port and a male component, whereby the male component is movable along the center axis of the female port can be implemented.

Figure 3A:
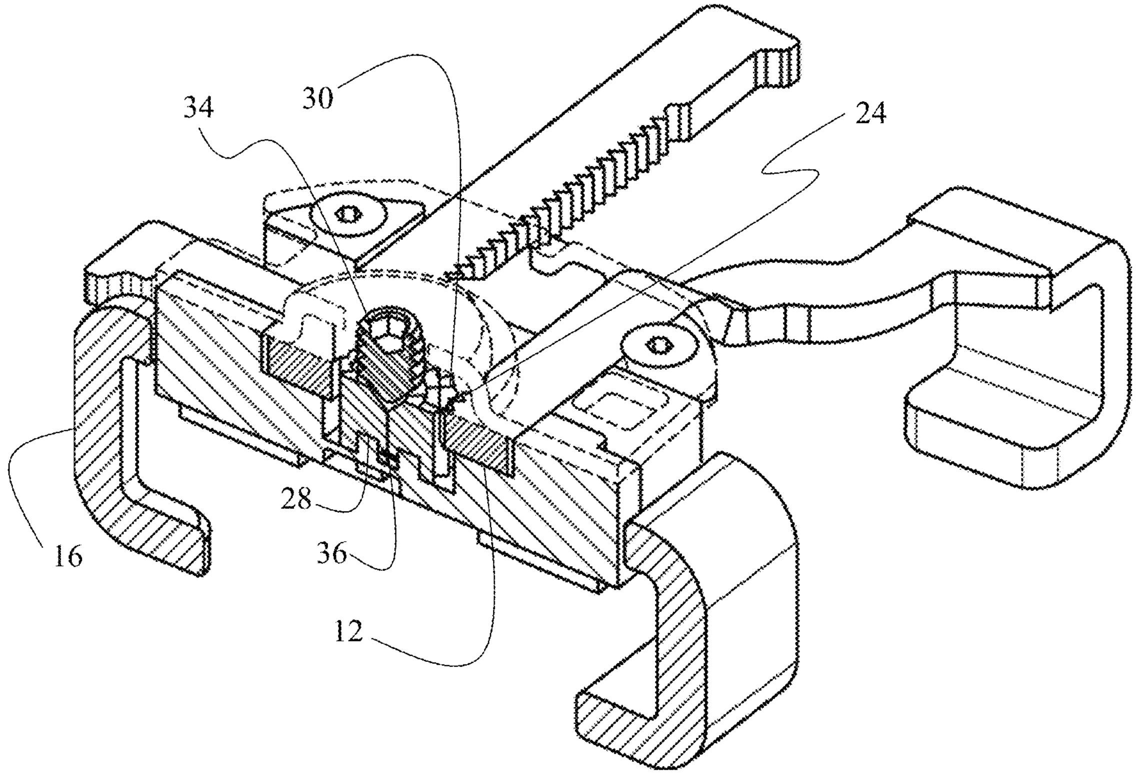
FIG. 3A is a perspective cut-away view of the anti-theft device in an unlocked configuration.
Figure 3B:
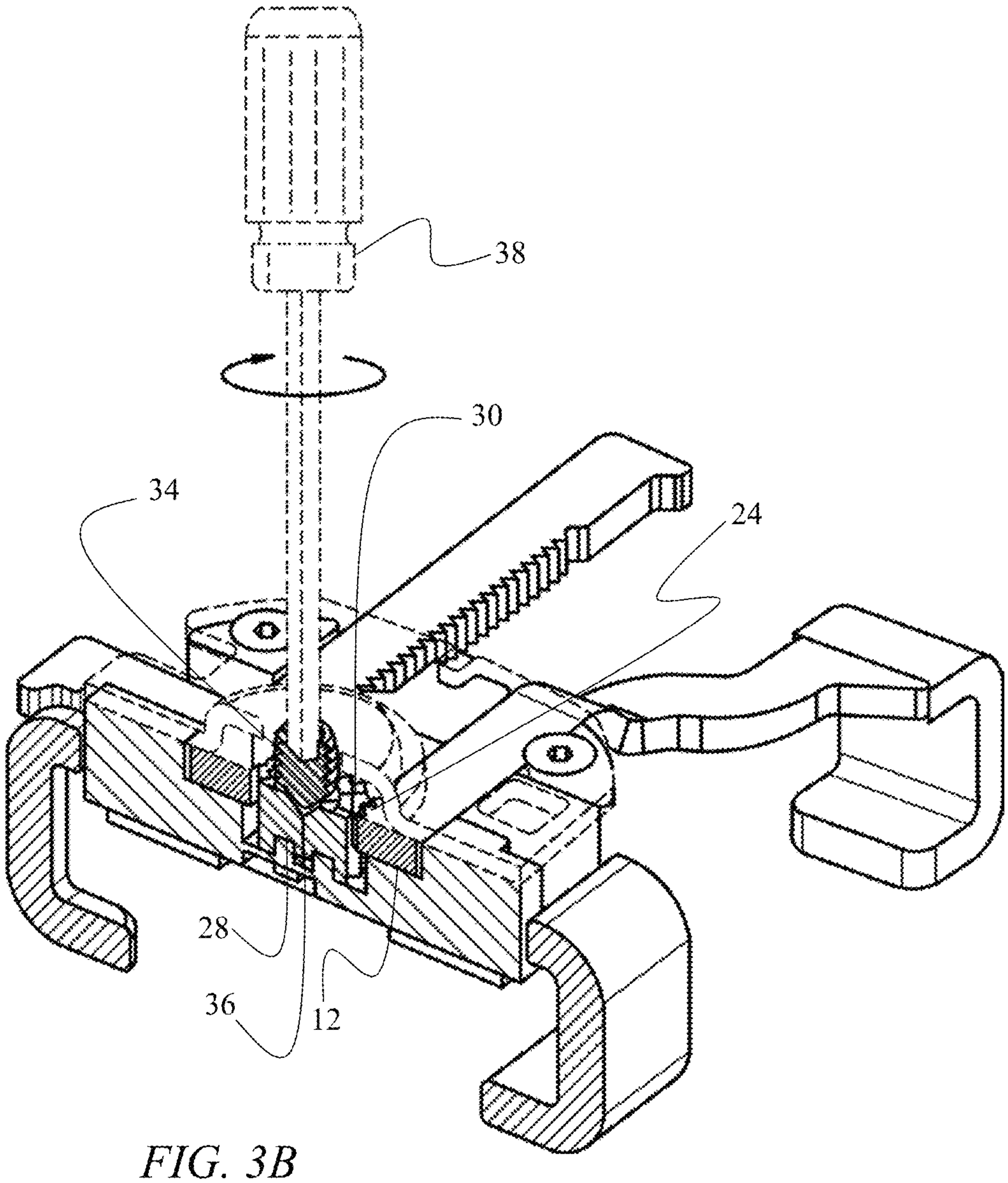
FIG. 3B is a perspective cut-away view of the anti-theft device in an unlocked configuration, wherein a semi-specialized tool is being used to operate the actuator.
Figure 3C:
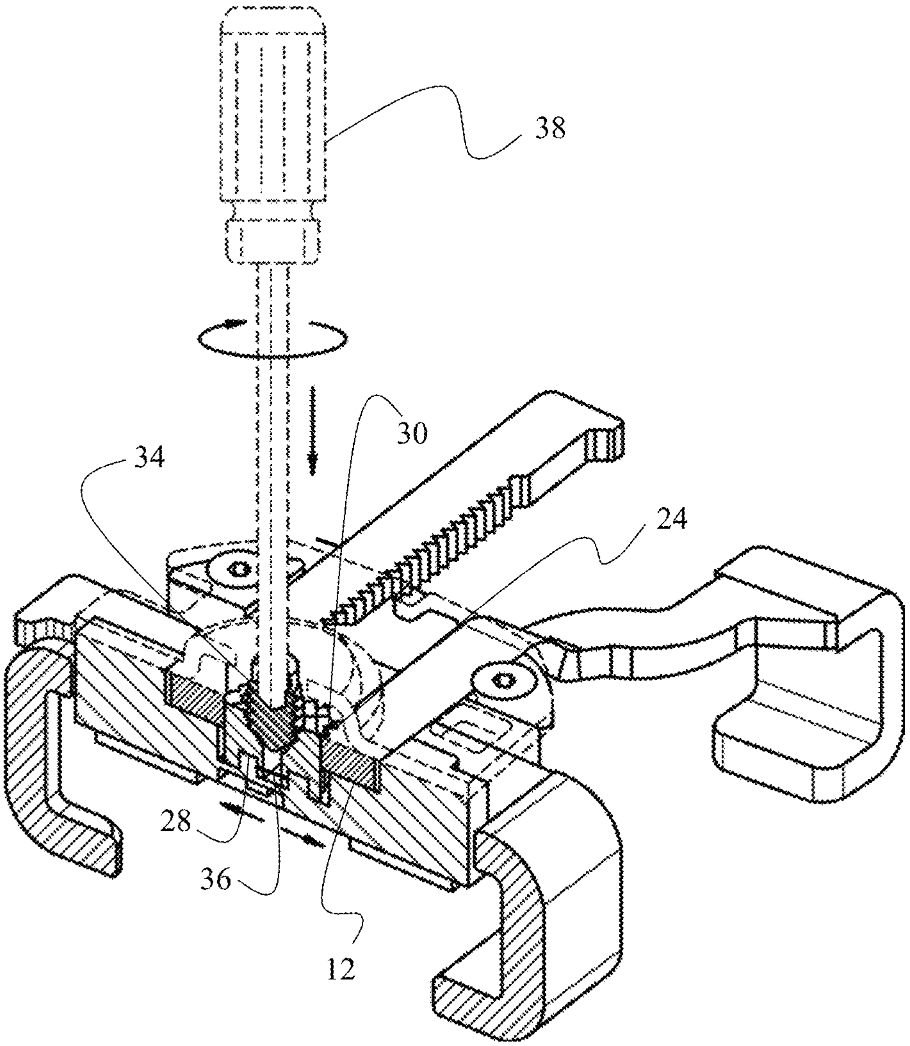
FIG. 3C is a perspective cut-away view of the anti-theft device in a locked configuration after the semi-specialized tool has been used to move the actuator.
Figure 4A:
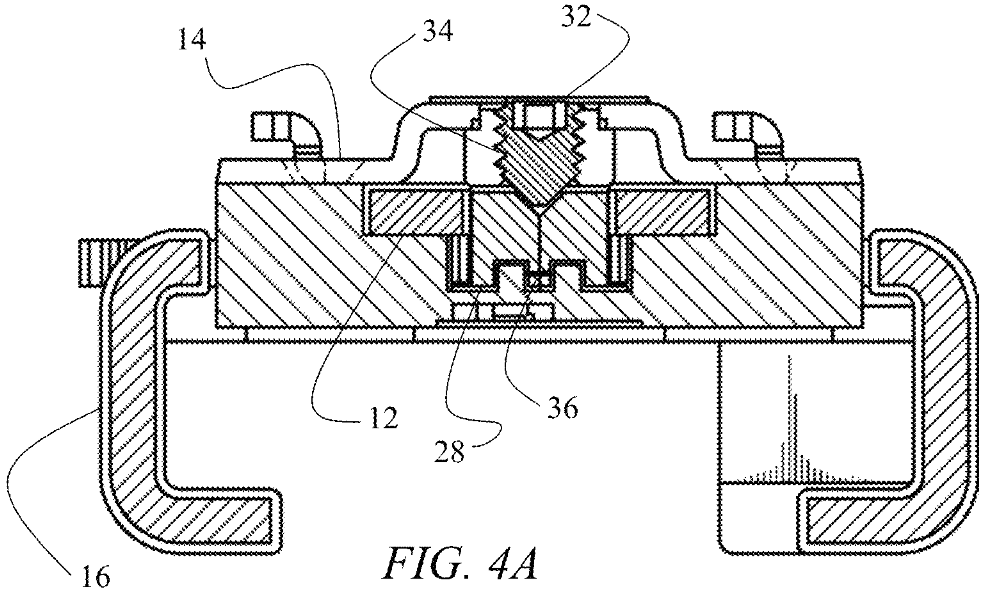
FIG. 4A is a front cut-away view of the anti-theft device in an unlocked configuration.

FIGS. 3A-C and 4A-B depict locking components 28 having sloping inner edges. Actuator 34 has a pointed distal end configured to engage the sloping edges of locking components 28. Locking components 28 are biased toward one another by a biasing element 36. Thus, as depicted in FIGS. 3A-B and 4A, when actuator 34 is in its retracted configuration, locking components 28 are biased toward one another. In this configuration, gear teeth 30 are retracted away from gear teeth 24, and, therefore, arms 12 are free to slide with respect to housing 14.

Figure 4B:
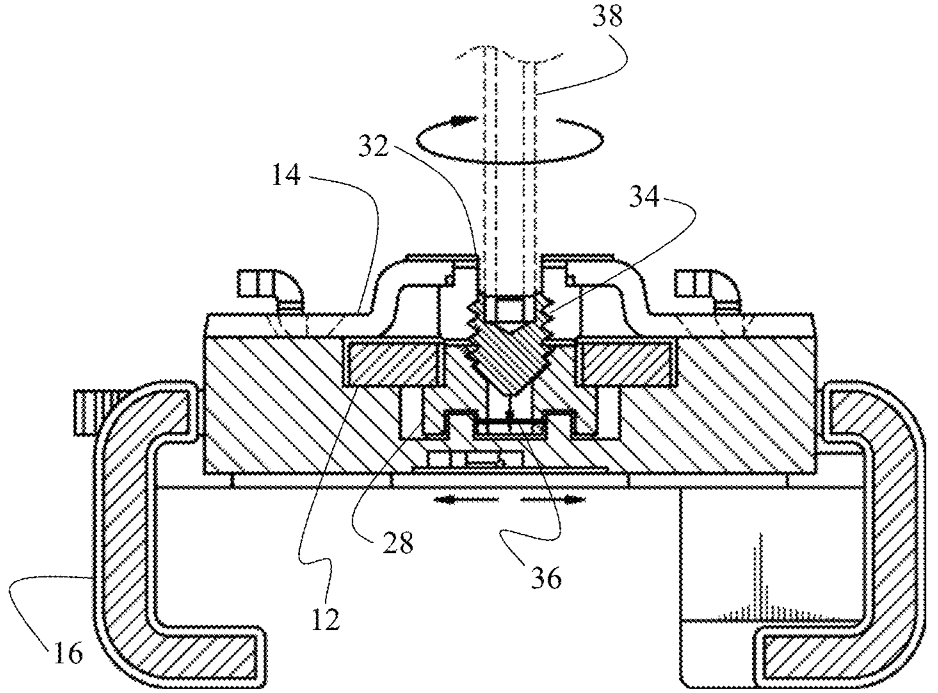
FIG. 4B is a front cut-away view of the anti-theft device in a locked configuration.

FIGS. 3B-C and 4B depict a semi-specialized tool 38 being used to manipulate actuator 34 in the embodiment in which port 32 and actuator 34 are in a screw-threaded engagement with one another. Clockwise rotation of tool 38 drives actuator downward. The pointed distal end of actuator 34 applies a force onto the sloping edges of locking members 28. Because the edges of locking members 28 and the pointed distal end of actuator 34 have complementary slopes, the force applied onto locking members 28 by actuator 34 has a horizontal component. The horizontal component of the applied force exceeds the biasing force exerted by biasing element 36, thereby causing locking members 28 to slide apart toward the position depicted in FIGS. 3C and 4B. In this configuration, gear teeth 30 of locking components 28 engage gear teeth 30 disposed along inner edges of arms 12, thereby immobilizing arms 12 within housing 14. This is the locked configuration of security device 10.

To transition security device 10 into the unlocked configuration, an authorized personnel member in possession of tool 38 uses tool 38 to rotate actuator 34 in a counterclockwise direction, thereby retracting actuator away from locking components 28. Biasing element 36 pulls locking components 28 toward each other, thereby disengaging gear teeth 30 from gear teeth 24. When the gear teeth 30 fully disengage gear teeth 24, security device 10 is in the unlocked configuration and lengths of arms 12 can be adjusted, thereby releasing the article of merchandise from grips 16.

Figure 4C:
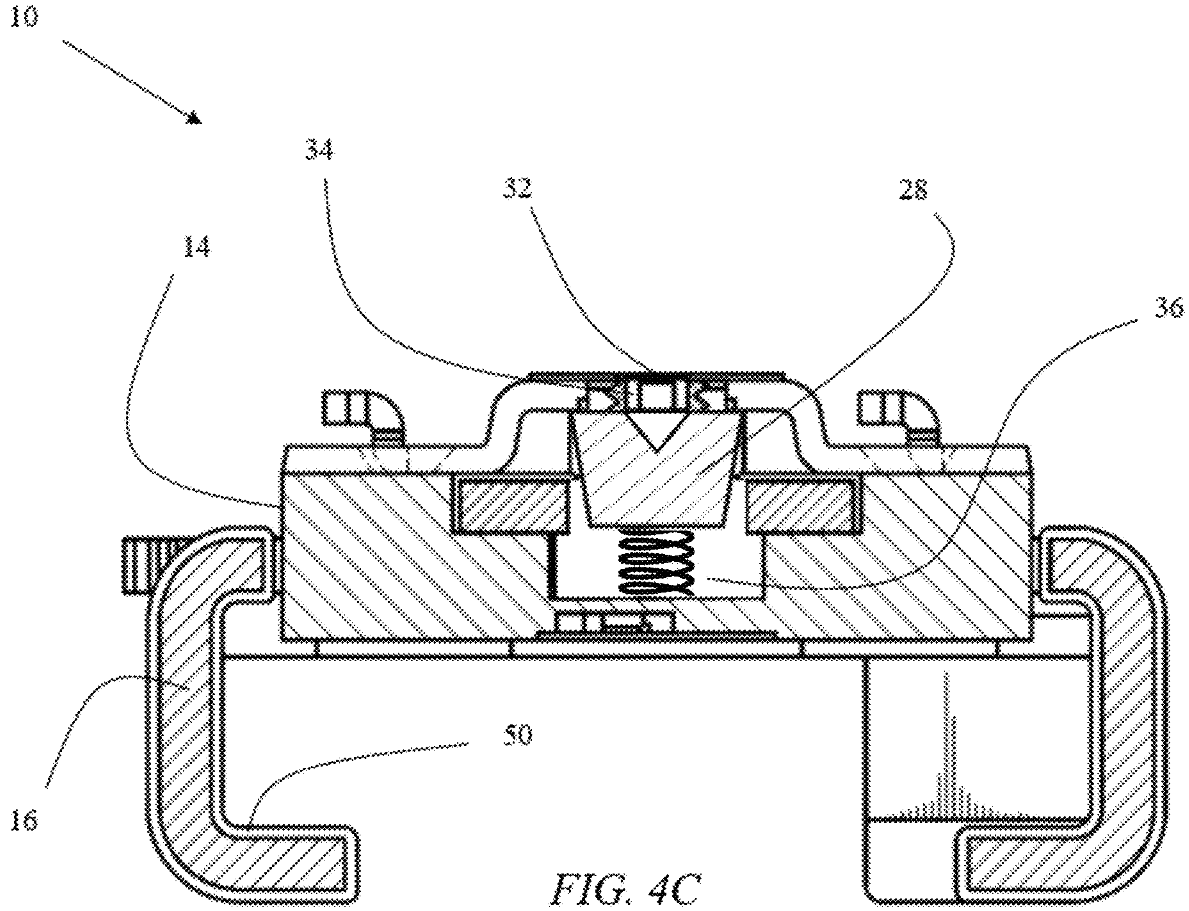
FIG. 4C is side cut-away view of an embodiment of the anti-theft device depicting the locking member in an unlocked configuration.
Figure 4D:
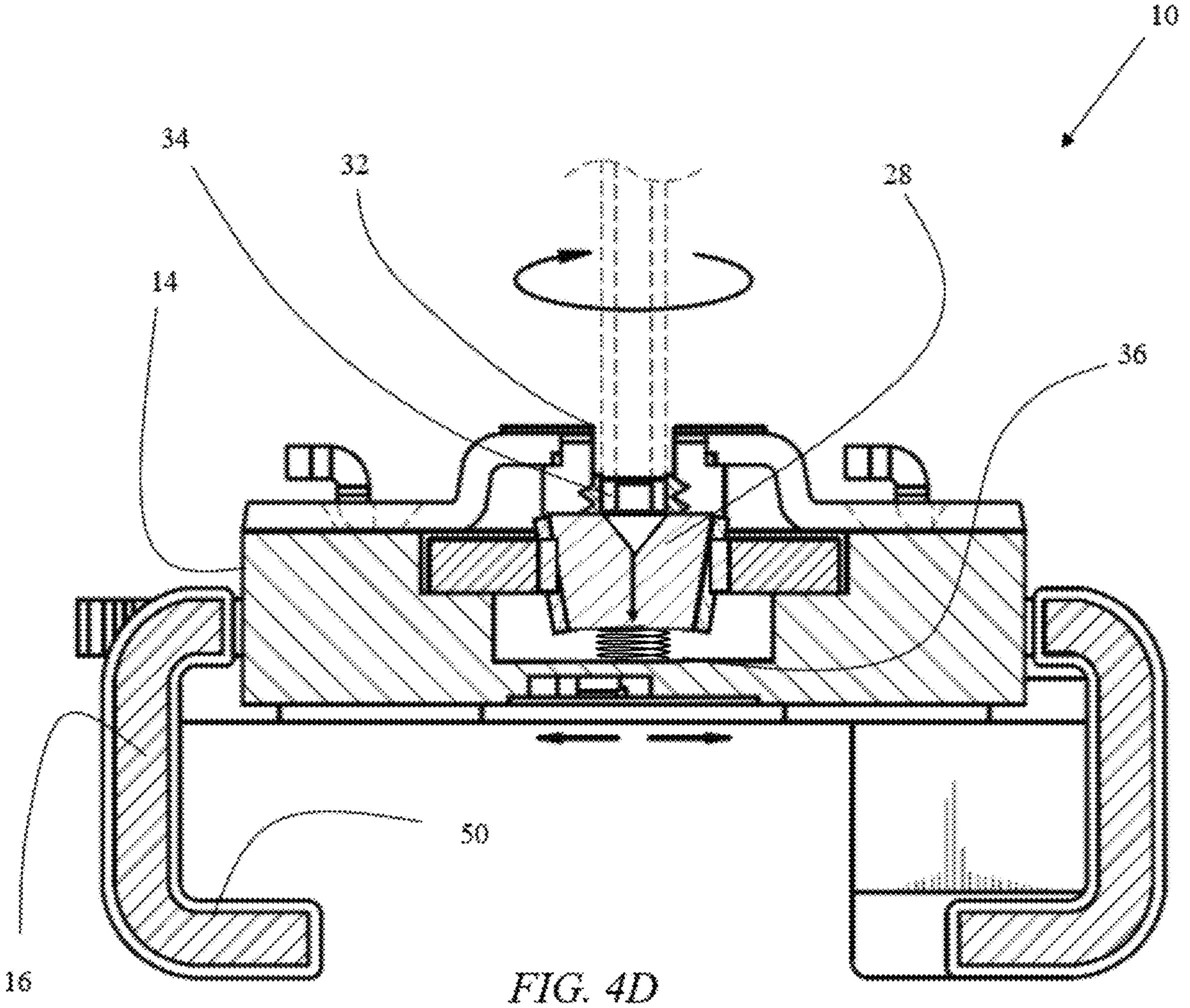
FIG. 4D is a side cut-away view of an embodiment of the anti-theft device depicting the locking member in a locked configuration.

In an embodiment depicted in FIGS. 4C and 4D, grips 16 are encased by sleeves 50. Sleeves 50 may be made of an elastomeric material having an elastic limit configured to withstand the maximum force exerted on the elastomeric material 50 by the article of merchandise when security device 10 is in the locked configuration. Elastomeric material 50 is nonconductive and allows for an article of merchandise to retain full functionality while secured within grips 16 (e.g., when grips 16 secure a cellular device within the security device 10 the elastomeric material does not interfere with the use of the touch screen of the cellular device). Some examples of acceptable elastomeric materials include ethylene propylene rubber, silicone rubber, fluoroelastomers, and any other material that one of ordinary skill in the art would appreciate to protect an article of manufacture from damage while being secured in security device 10.

FIGS. 4C and 4D depict a semi-specialized tool 38 being used to operate actuator 34 in the embodiment in which port 32 and actuator 34 are in a screw-threaded engagement with one another. Clockwise rotation of tool 38 drives actuator 34 downward. The distal end of actuator 34 applies a force onto locking member 28. The force applied onto locking members 28 by actuator 34 exceeds the biasing force exerted by biasing element 36, thereby causing locking members 28 to translate linearly toward the position depicted in FIG. 4D. In this configuration, gear teeth 24 of locking components 28 engage gear teeth 30 disposed along inner edges of arms 12, thereby immobilizing arms 12 within housing 14. This is the locked configuration of security device 10.

Figure 5A:
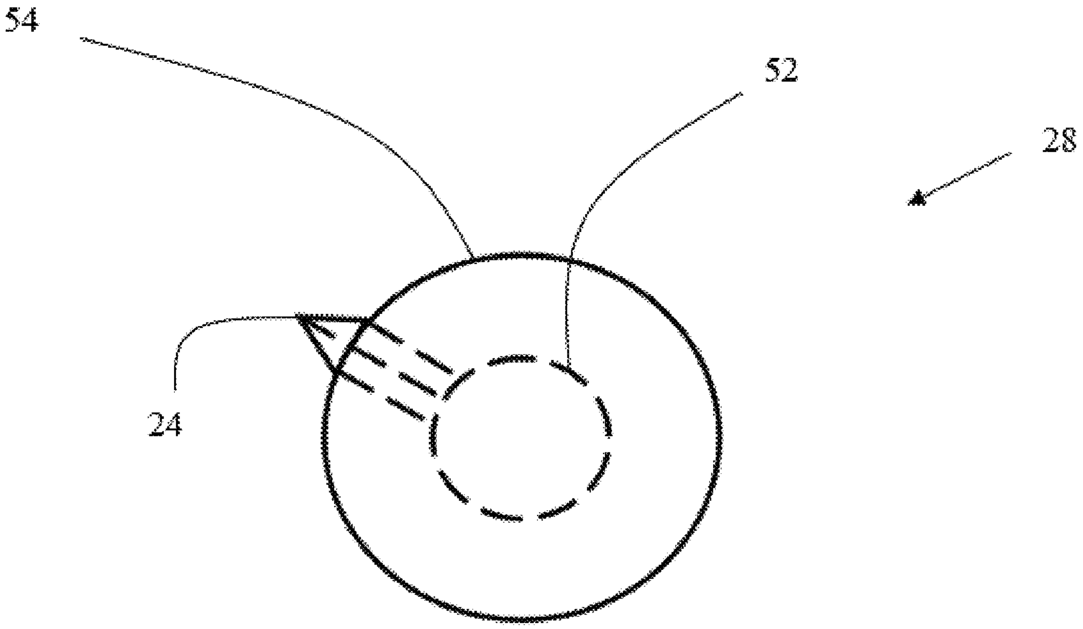
FIG. 5A is a top view of the frustoconically-shaped locking member.
Figure 5B:
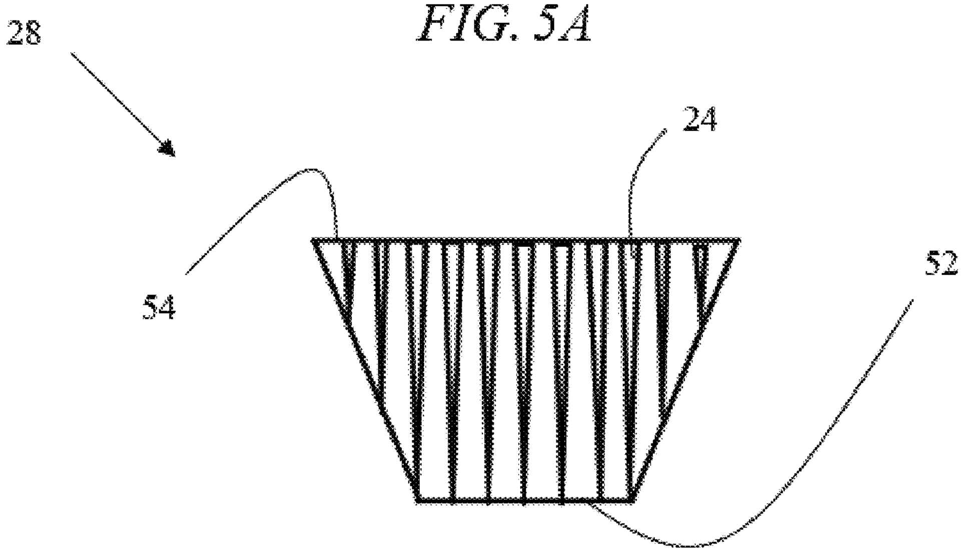
FIG. 5B is a side view of the locking member depicting teeth disposed on the outside surface thereof.

FIGS. 5A and 5B depict locking member 28 from the embodiment of security device 10 depicted in FIGS. 4C and 4D. In this embodiment, locking member 28 has a frustoconical shape having gear teeth 24 disposed along an outside surface of locking member 28, wherein each year tooth 24 extends along a longitudinal extent formed between a first smaller circumference 52 and a second larger circumference 54. Gear teeth 24 have complementary shapes to gear teeth 30 and protrude radially relative locking member 28 such that when actuator 34 drives locking member 28 toward arms 12, gear teeth 24 engage gear teeth 30, thereby immobilizing arms 12 within housing 14.

To transition security device 10 into the unlocked configuration, an authorized personnel member in possession of tool 38 uses tool 38 to rotate actuator 34 in a counterclockwise direction, thereby retracting actuator 34 away from locking component 28. Biasing element 36 urges locking component 28 away from arms 12, thereby disengaging gear teeth 24 from gear teeth 30. When the gear teeth 24 are fully disengaged from gear teeth 30, security device 10 is in the unlocked configuration and lengths of arms 12 extending beyond housing 14 can be adjusted, thereby releasing the article of merchandise from grips 16.

3-Arm Adjustable Bracket

Figure 6:
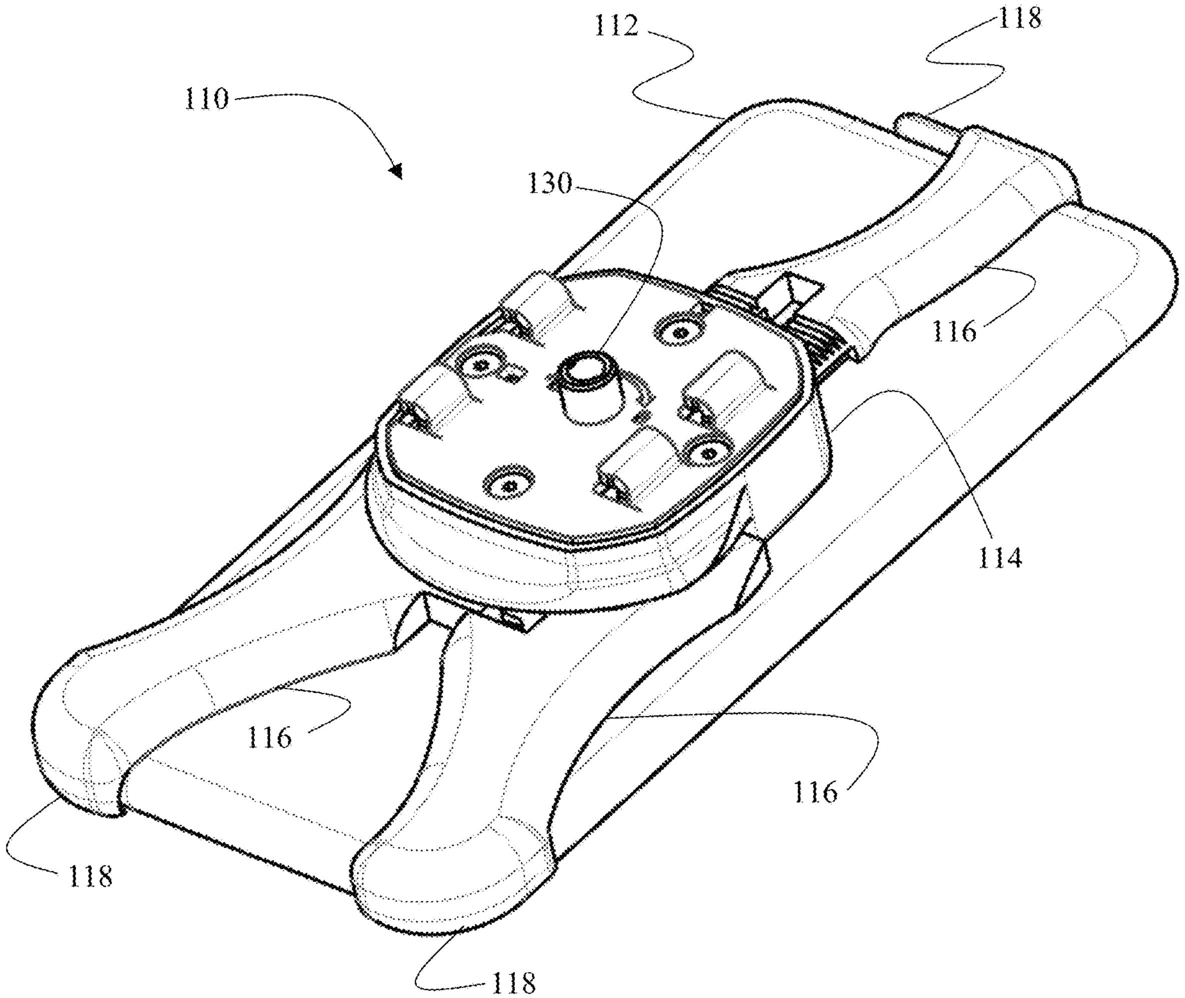
FIG. 6 is a perspective view of a 3-arm bracket embodiment securing an article of merchandise.

FIGS. 6-13 pertain to an embodiment of a security device 110 having a 3-arm adjustable bracket configured to secure an article of merchandise 112. Security device 110 includes a housing 114, wherein three arms 116 extend from housing 114, each arm 116 terminating with a grip 118. FIG. 6 depicts an exemplary embodiment in which two grips 118 are configured to engage corners of article of merchandise 112, while the third grip 118 is configured to engage a side of article of merchandise 112. In an alternative embodiment (not depicted), security device 110 may comprise two, rather than three, arms 116. One or more arms 116 can branch out and can have multiple grips 118.

Figure 7:
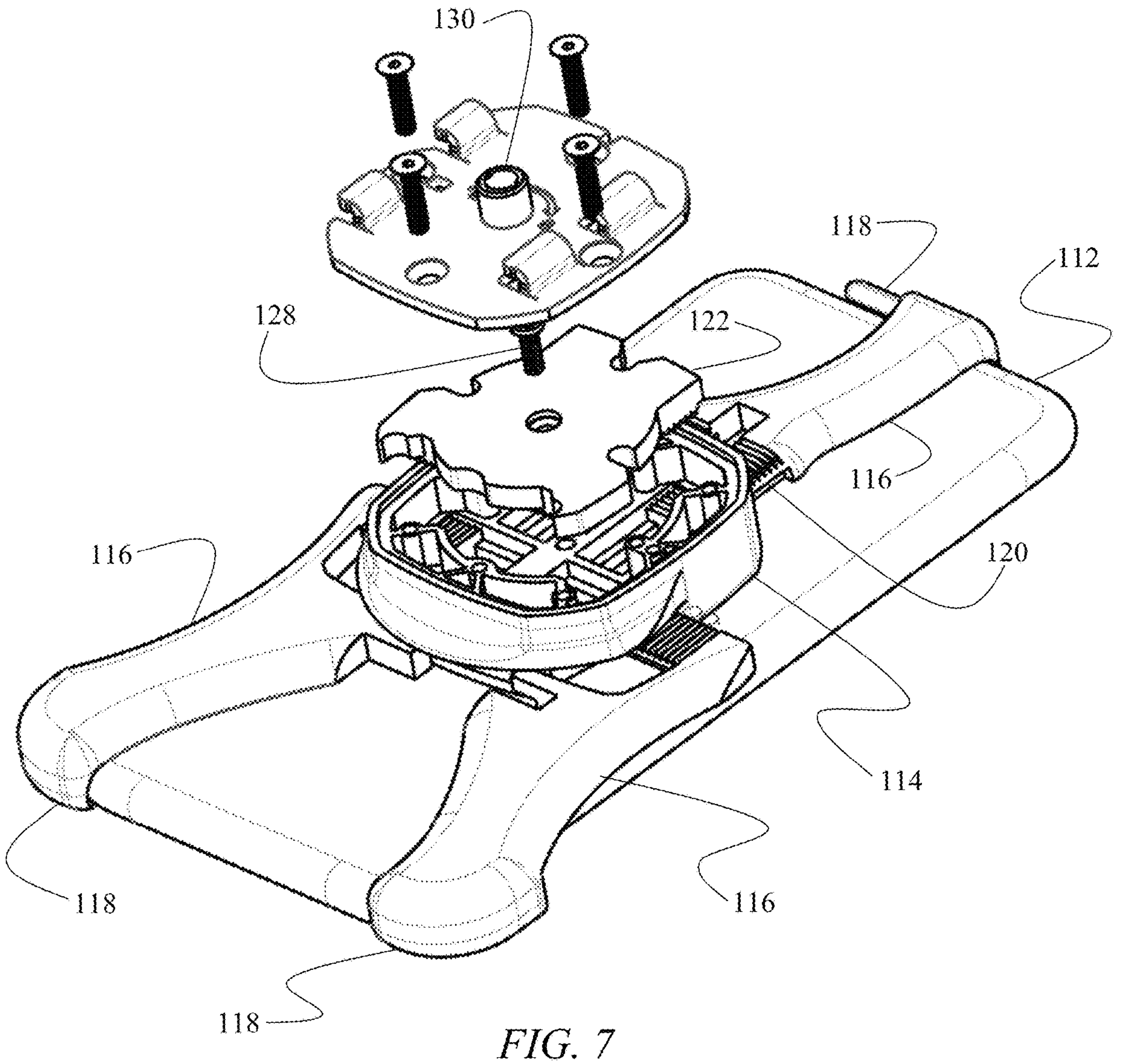
FIG. 7 is an exploded perspective view of the 3-arm bracket embodiment depicting the interior view of the housing.
Figure 8:
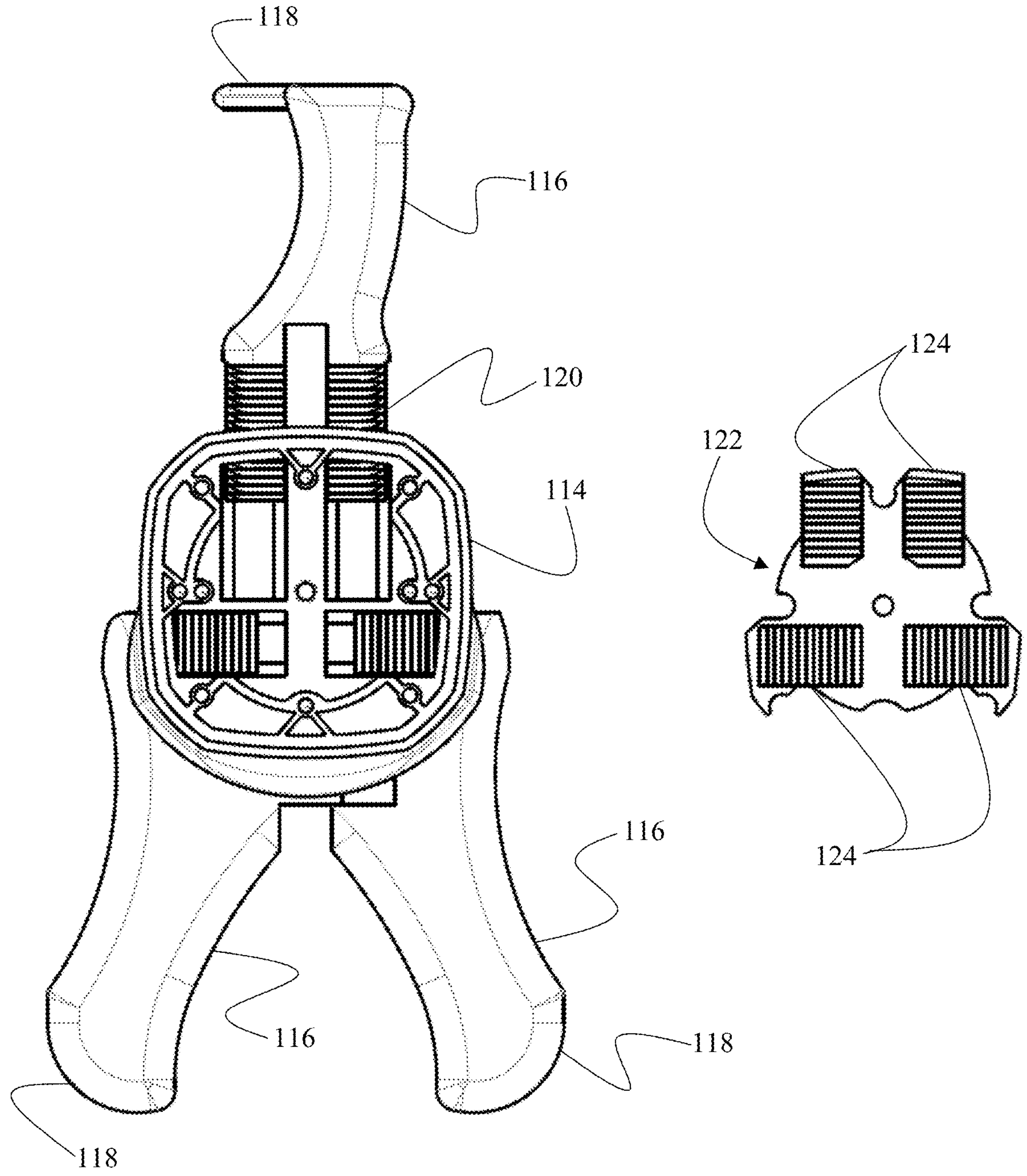
FIG. 8 is a top view of the 3-arm bracket embodiment depicting the housing with the removed cover and a top view of the locking component.

Referring to FIGS. 7 and 8, the length of each arm 116 extending beyond housing 114 can be independently adjusted when security device 110 is in an unlocked configuration. In an alternative embodiment, one or more arms 116 may be fixed, but at least one arm 116 must be movable relative to housing 114.

To secure the article of merchandise 112, a user slides at least one arm 116 into a position in which distances between grips 118 are greater than the length and/or width of the article of merchandise 112. Next, the article of merchandise 112 is placed into security device 110 such that a back surface of the article of merchandise 112 abuts housing 114. Then, the user slides one or more arms 116 into a position in which each grip 118 securely engages an edge (i.e., a corner or a lateral side) of the article of merchandise 112.

As depicted in FIGS. 7-8, distal ends of arms 116 reside within housing 114. The section of each arm 116 residing within housing 114 has a first set of teeth 120 disposed thereon. Security device 110 further includes a locking component 122 residing within housing 114. Locking component 122 has a second set of teeth 124 disposed thereon. Second set of teeth 124 disposed on locking component 122 is configured to interlock with the first set of teeth 120 disposed on arms 116.

As depicted in FIGS. 9A-B and 10A-B, locking component 122 is transitionable between an unlocked configuration and a locked configuration. In the unlocked configuration, depicted in FIGS. 9A and 10A, locking component 122 is retracted away from arms 116, such that second set of teeth 124 does not engage first set of teeth 120. In this unlocked configuration, arms 116 can slide freely relative to housing 114.

Figure 9A:
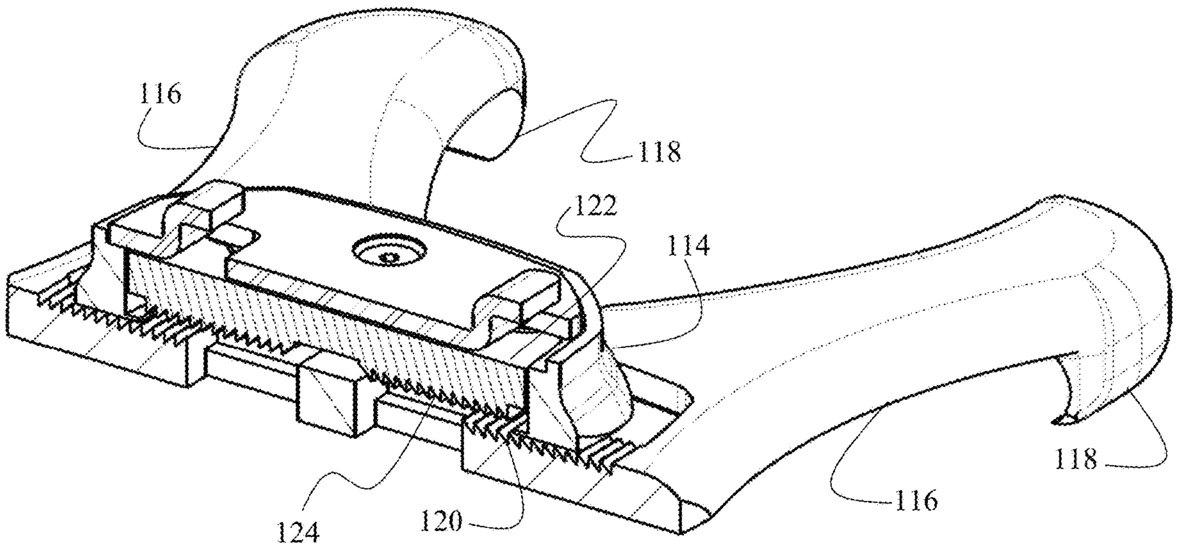
FIG. 9A is a first perspective cutaway view depicting the security device in an unlocked configuration in which the locking component is retracted away from the distal ends of the arms residing within the housing.
Figure 9B:
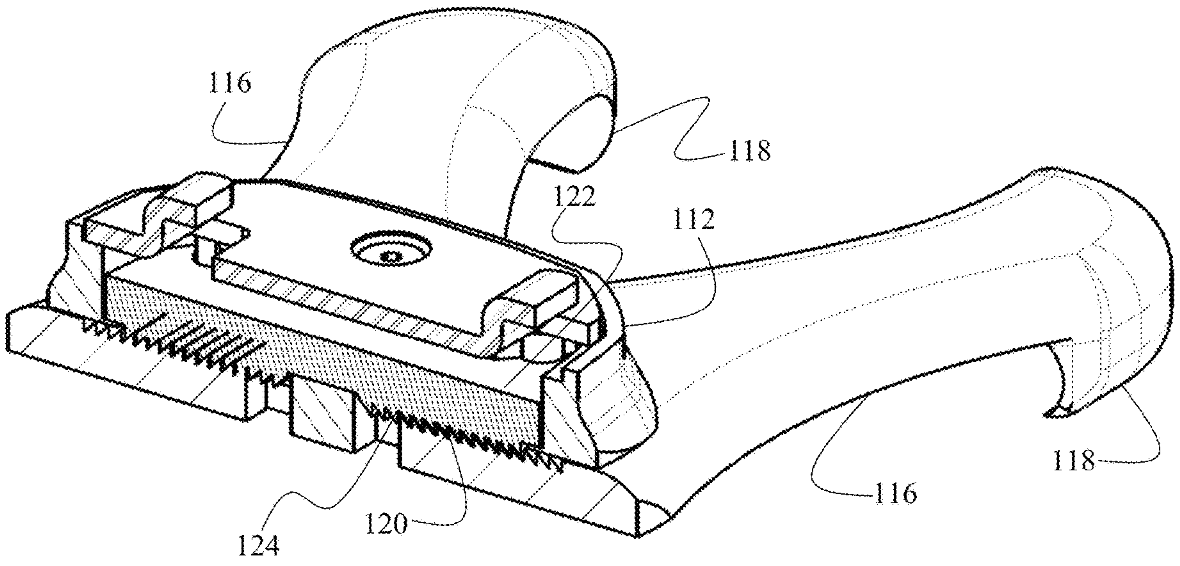
FIG. 9B is a first perspective cutaway view depicting the security device in a locked configuration in which the locking component is pressed against the distal ends of the arms residing within the housing.
Figure 10A:
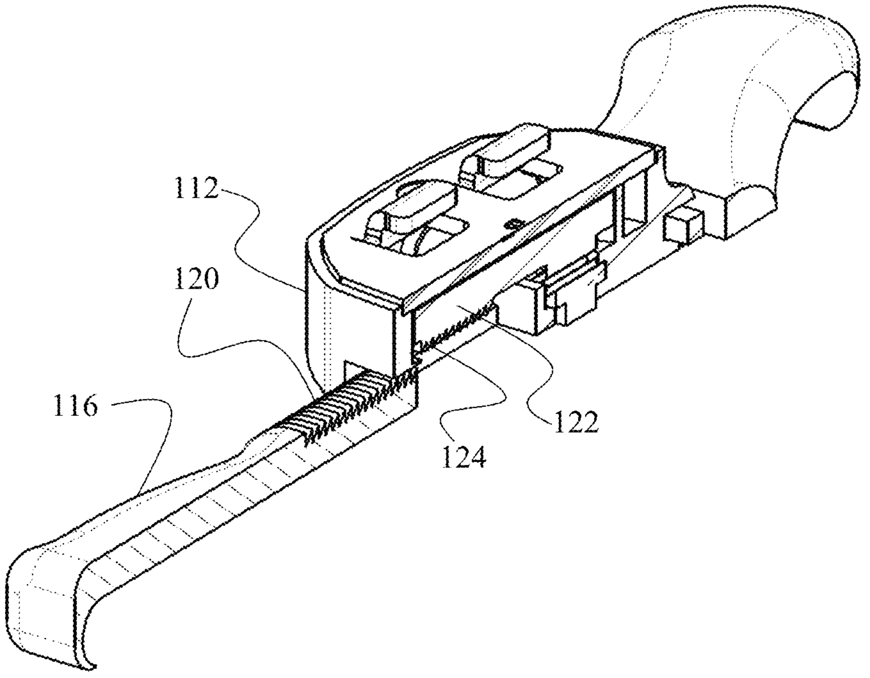
FIG. 10A is a second perspective cutaway view depicting the security device in the unlocked configuration in which the locking component is retracted away from the distal ends of the arms residing within the housing.
Figure 10B:
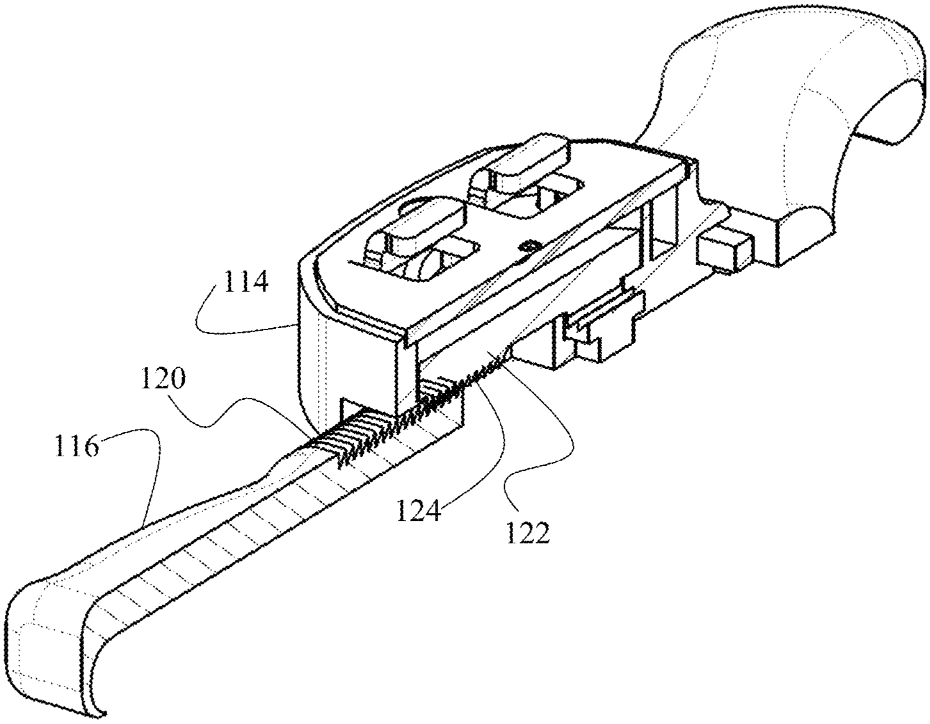
FIG. 10B is a second perspective cutaway view depicting the security device in the locked configuration in which the locking component is pressed against the distal ends of the arms residing within the housing.

In the locked configuration, depicted in FIGS. 9B and 10B, locking component 122 is pressed against the distal ends of arms 116 residing within housing 114. When locking component 122 is depressed relative to housing 114, second set of teeth 124 engages first set of teeth 120. When the two sets of teeth are interlocked, arms 116 cannot slide relative to housing 114 and, therefore, become immobilized. In this manner, when article of merchandise 112 is received within grips 118 of arms 116, and locking component 122 has been transitioned into the locked configuration, arms 116 become immovable. Accordingly, in the locked configuration of security device 110, article of merchandise 112 cannot be removed from grips 118 until locking component 122 is retracted away from arms 116, and second set of teeth 124 disengages first set of teeth 120, thereby releasing arms 116.

FIGS. 9A-B depict a cutaway view of security device 110, illustrating the process of transitioning locking component 122 from an unlocked configuration into a locked configuration. FIG. 9A depicts locking component 122 in the unlocked configuration. In this configuration, locking component 122 is retracted away from the distal ends of arms 116 residing within housing 114. In this retracted position, second set of teeth 124 of locking component 122 does not engage first set of teeth 120 of arms 116. Accordingly, in the unlocked configuration depicted in FIG. 9A, a user can slide arms 116 with respect to housing 114, without interference from locking component 122. In an embodiment, arms 116 may have flanges to prevent arms 116 from being completely removed from housing 114.

FIG. 9B depicts the locked configuration of security device 110. In this configuration, locking component 122 is pressed against arms 116, such that second set of teeth 124 engages first set of teeth 120. As depicted in FIG. 9B, when first and second sets of teeth 120/124 interlock, arms 116 become immobilized against movement relative to housing

114. Accordingly, in the locked configuration depicted in FIG. 9B, arms 116 cannot be moved apart and, therefore, the article of merchandise 112 cannot be removed from security device 110.

Analogously, FIGS. 10A-B provide cutaway views depicting locked and unlocked configurations relative to the third arm 116. In the unlocked configuration depicted in FIG. 10A, locking component 122 is retracted away from arm 116, thus enabling arm 116 to slide relative to housing 114. In FIG. 10B, locking component 122 is pressed against the distal end against arm 116, such that second set of teeth 124 engages first set of teeth 120, thereby immobilizing arm 116 relative to housing 114.

In the manner described above, in the locked configuration, locking component 122 is pressed against distal ends of arms 116. In this configuration, second set of teeth 124 of locking component 122 interlocks with first set of teeth 120 of arms 116, preventing arms 116 from sliding apart. Thus, when locking component 122 is pressed against distal ends of arms 116, the engagement of first and second sets of teeth 120 and 124 immobilizes arms 116 relative to housing 114. Thus, arms 116 cannot be manipulated to release article of merchandise 112.

In an embodiment, first set of teeth 120 of arms 116, second set of teeth 124 of locking component 122, or both have sloping mating surfaces. The direction of the slopes is such that when second set of teeth 124 is pressed against first set of teeth 120, the downward force applied onto sloping surfaces of teeth 120 translates into an inward horizontal force which causes arms 116 to slide inwardly relative to housing 114. In this manner, security device 110 ensures that article of merchandise 112 does not become loose within grips 118 due to accidental outward movement of arms 116 during the locking procedure. Thus, the sloping surfaces of teeth 120 and 124 drive arms 116 inwardly, ensuring a tight grip on article of merchandise 112.

Furthermore, to protect the article of merchandise 112 against excessive force applied by grips 118 of arms 116, grips 118 can be encased by sleeves. These sleeves may be made of an elastomeric material. Elastomeric material is preferably nonconductive, so that article of merchandise 112 can retain full functionality when secured within grips 118. Specifically, nonconductive sleeves ensure that grips 118 do not interfere with the touchscreen of the electronic device being secured therein.

Figure 11:
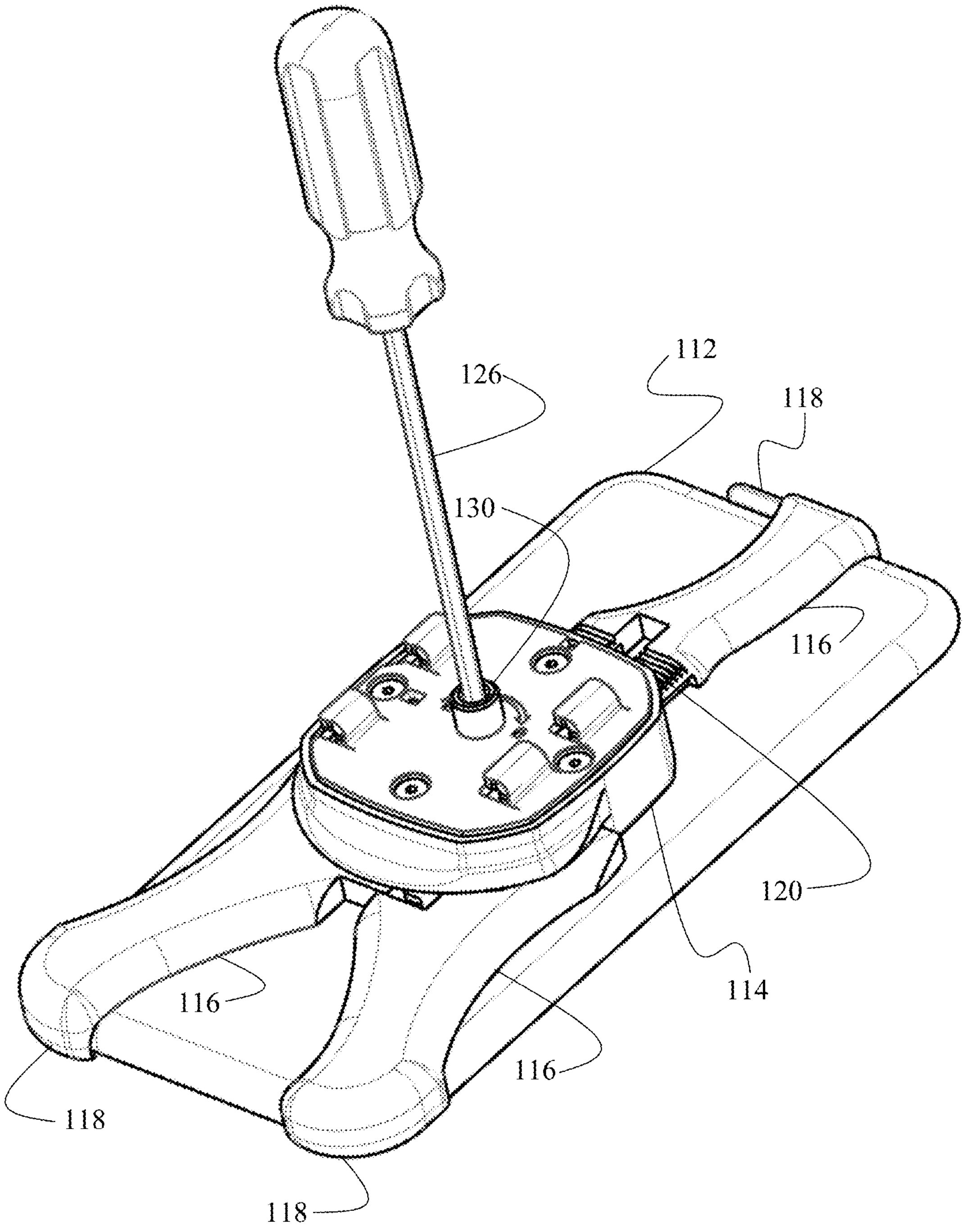
FIG. 11 is a perspective view depicting a semi-specialized tool inserted into an access port to operate the actuator transitioning the locking component between the locked and unlocked positions.
Figure 12A:
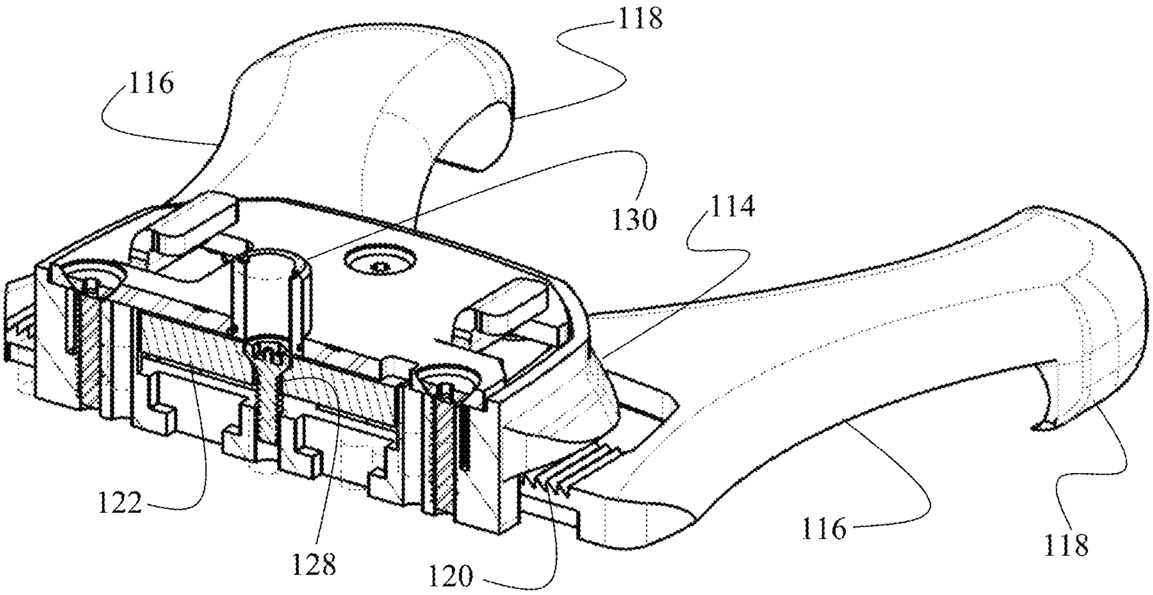
FIG. 12A is a perspective cutaway view of the unlocked configuration depicting the actuator in a position that enables the locking component to retract away from the distal ends of the arms.
Figure 12B:
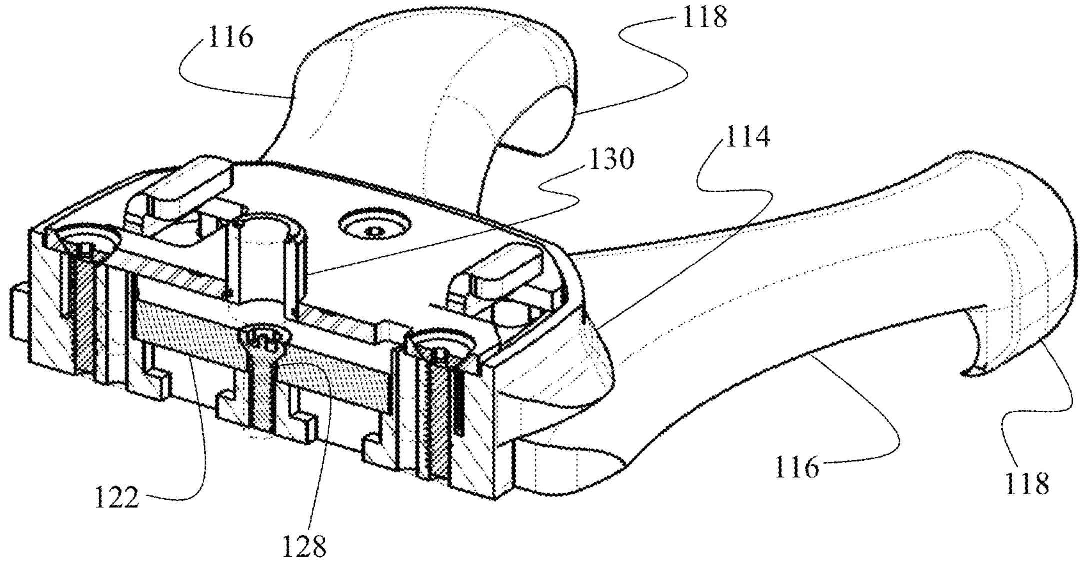
FIG. 12B is a perspective cutaway view of the locked configuration depicting the actuator in a position that presses the locking component against the distal ends of the arms and retains the locking component in this configuration.

FIG. 11 depicts an exemplary implementation of a mechanism for transitioning locking component 122 between the locked and unlocked configurations. In this implementation, housing 114 has an access port 130. An actuator 128, which is depicted in FIGS. 12A and 12B, resides within housing 114 and can be engaged via access port 130. Semi-specialized tool 126 can be rotated about its axis to drive actuator 128 inwardly or outwardly with respect to housing 114.

Next, FIG. 12A depicts security device 110 in an initial unlocked configuration, in which actuator 128 permits locking component 122 to be retracted away from arms 116. Next, semi-specialized tool 126 can be rotated to drive actuator 128 inwardly relative to housing 114. As actuator 128 translates downwardly, it exerts a force onto locking component 122, pressing it into distal ends of arms 116 as security device 110 transitions into its locked configuration.

FIG. 12B depicts the locked configuration of security device 110, in which second set of teeth 124 interlocks first set of teeth 120, thereby immobilizing arms 116. FIG. 12B further depicts that actuator 128 retains locking component 122 in its locked configuration. It shall be understood that driving actuator 128 in an opposite direction would release locking component 122, enabling it to retract away from distal ends of arms 116, thereby returning security device 110 to the unlocked configuration depicted in FIG. 12A.

In an embodiment, locking component 122 may be biased toward the locked configuration. In this embodiment, a biasing element, such as a spring, exerts a biasing force onto locking component 122, pressing it into distal ends of arms 116. In an alternative embodiment, locking component 122 may be biased toward the unlocked configuration. In this embodiment, when actuator 128 releases locking component 122, the biasing element exerts a force onto locking component 122 to retract it away from distal ends of arms 116. In this manner, when the user drives actuator 128 outwardly, locking component 122 is automatically retracted into the unlocked configuration, releasing arms 116. To transition locking component 122 back into the locked configuration, a user drives actuator 128 inwardly relative to housing 114, which causes actuator 128 to press locking component 122 into distal ends of arms 116, against the biasing force.

In another embodiment, the biasing element may be eliminated altogether. In this embodiment, after moving actuator 128 into the unlocked position, the user can manipulate arms 116 by applying a moment to proximal ends thereof, thereby causing the distal ends of arms 116 to rise within housing 114. When distal ends of arms 116 rise, they apply an upward force onto locking component 122, causing locking component 122 to retract away from arms 116, thereby releasing them.

When security device 110 is deployed in a retail environment, housing 114 can be configured either to couple directly to a pedestal mounted onto a display counter or to couple to a cover anchored to the display counter via a tether. FIG. 11 depicts latching hooks disposed on the underside of housing 114 which are used for this purpose, as disclosed in U.S. Pat. No. 10,323,440. When housing 114 is coupled to a pedestal or a cover, access port 130 is concealed, thereby preventing unauthorized access to actuator 128. Thus, to release the article of merchandise 112 from security device 110, a user must first use the required key to decouple housing 114 from the pedestal/cover to reveal access port 130. Then, the user must use semi-specialized tool 126 to drive actuator 128 into an unlocked position to release locking component 122 from its locked configuration. Only then will the user be able to slide apart arms 116 to remove the article of merchandise 112 from security device 110. In this manner, when deployed in a retail environment, security device 110 provides multiple layers of anti-theft protection for the article of merchandise 112.

Figure 13A:
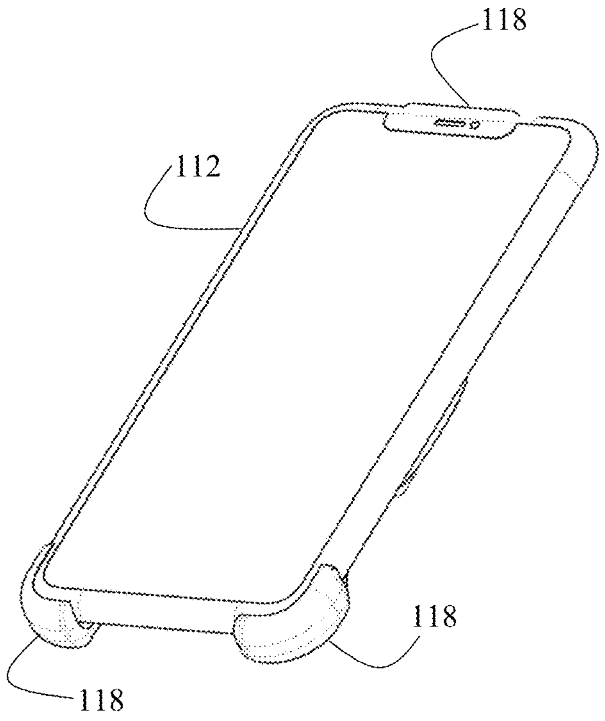
FIG. 13A is a perspective view depicting the 3-arm bracket embodiment of the security device securing an article of merchandise in a portrait configuration.
Figure 13B:
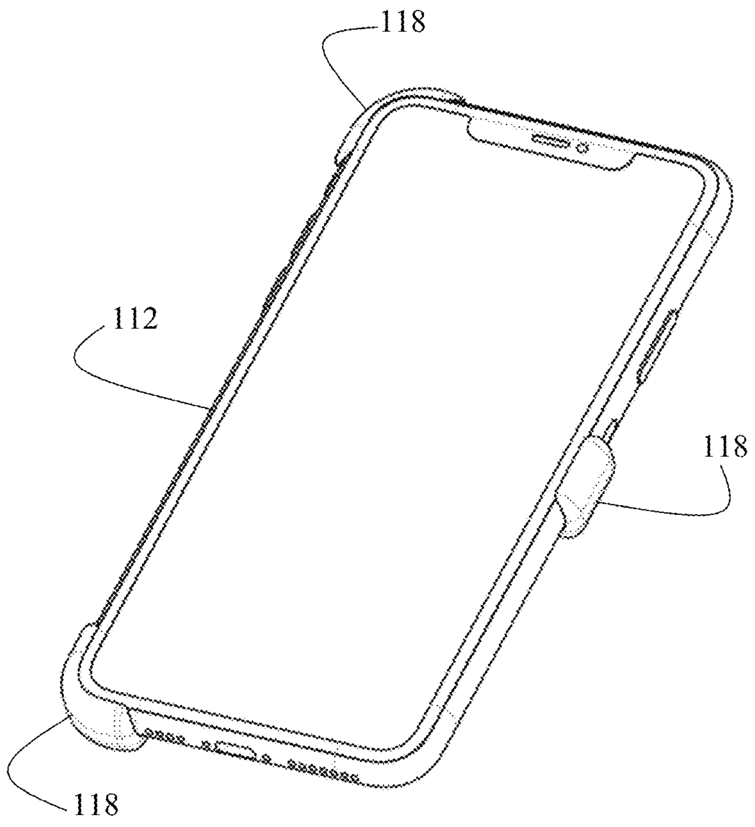
FIG. 13B is a perspective view depicting the 3-arm bracket embodiment of the security device securing an article of merchandise in a landscape configuration.

Finally, FIGS. 13A and 13B depict that security device 110 can secure article of merchandise 112 in multiple ways. For example, portrait configuration is depicted in FIG. 13A, while a landscape configuration is depicted in FIG. 13B. This versatility provides an advantage of enabling the retail stores to display the merchandise 112 in a variety of orientations.

Security Bracket with Triple-Stacked Adjustable Arms

Figure 14:
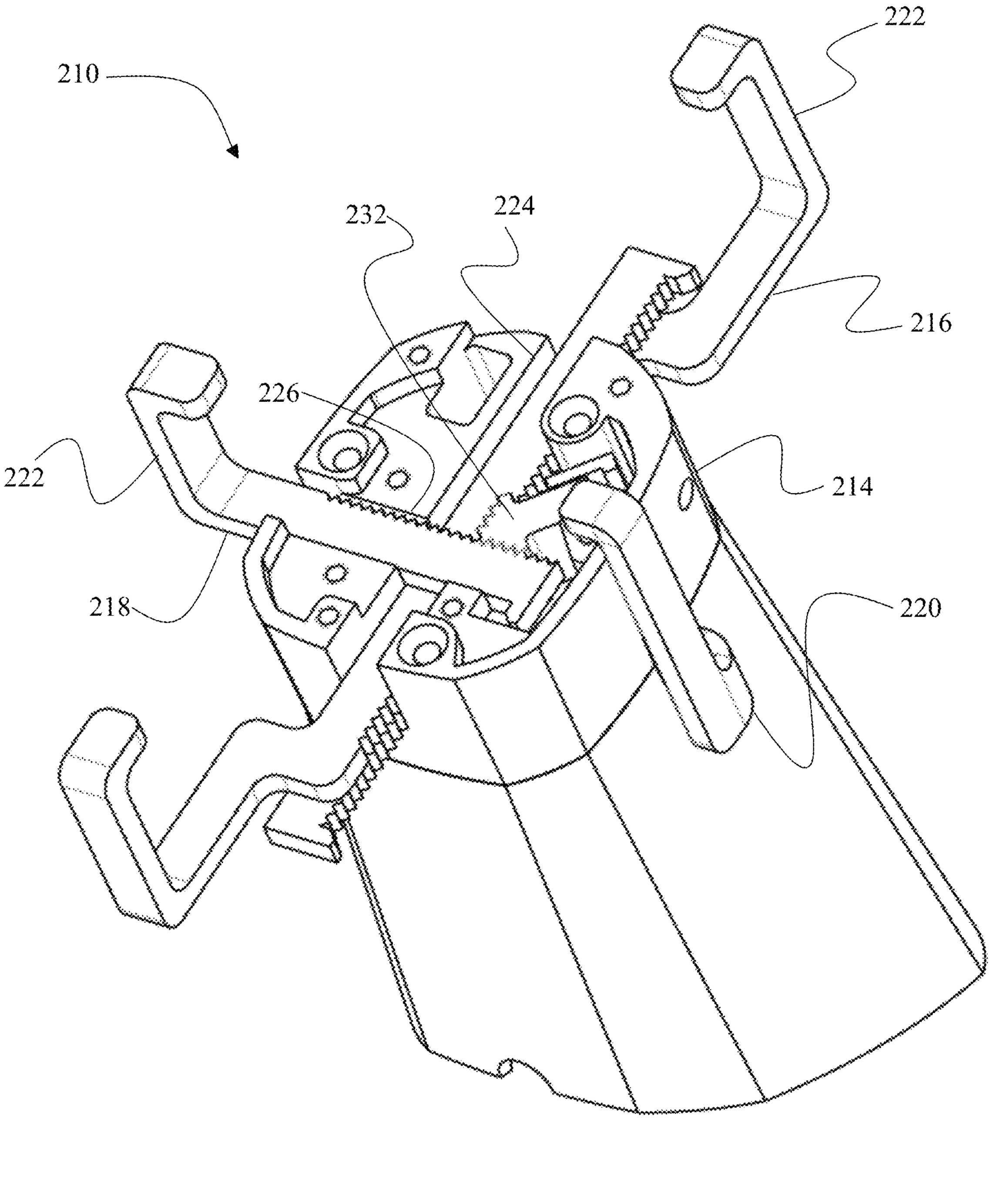
FIG. 14 is a perspective view of a triple-stacked arm embodiment of the security device in a locked configuration.

FIG. 14 depicts a perspective view of another embodiment of the invention. In this embodiment, security device 210 comprises a housing 214. Two vertical arms 216 and a horizontal arm 218 are slidingly disposed relative to housing 214. Vertical arms 216 and horizontal arm 218 are manually adjustable relative to housing 214. When security device 210 is in an unlocked configuration, the length of the portion of each arm 216 and 218 extending beyond housing 214 can be independently adjusted by sliding arms 216 and/or arm 218 inwardly or outwardly relative to housing 214.

In the embodiment of FIG. 14, security device 210 further includes an electromechanical arm 220. The length of the portion of arm 220 protruding beyond housing 214 can be adjusted using electromechanical means, for example, an electrical motor or a solenoid. In alternative embodiments, arm 220 can be manually adjustable or stationary.

The terminal end of each arm comprises a grip 222. Grips 222 are configured to receive edges or corners of an article of merchandise. To secure the article of merchandise using security device 210, a user adjusts the lengths of the sections of arms 216 and 218 protruding beyond housing 214 by sliding arms 216 and 218 out of housing 214, such that the distances between their respective grips 222 are greater than the length and width of the article of merchandise being secured. Next, the article of merchandise can be placed into security device 210, such that a back surface of the article of merchandise rests on a top surface of housing 214. Then, the user adjusts the lengths of the portions of arms 216, 218, and/or 220 protruding beyond housing 214, such that each grip 222 securely engages a corner or a lateral side of the article of merchandise. In this configuration, grips 222 of arms 216, 218, and 220 immobilize the article of merchandise relative to housing 214. At this point, security device 210 can be locked, such that arms 216, 218, and 220 can be extended from housing 214, and the article of merchandise cannot be removed therefrom.

Figure 15:
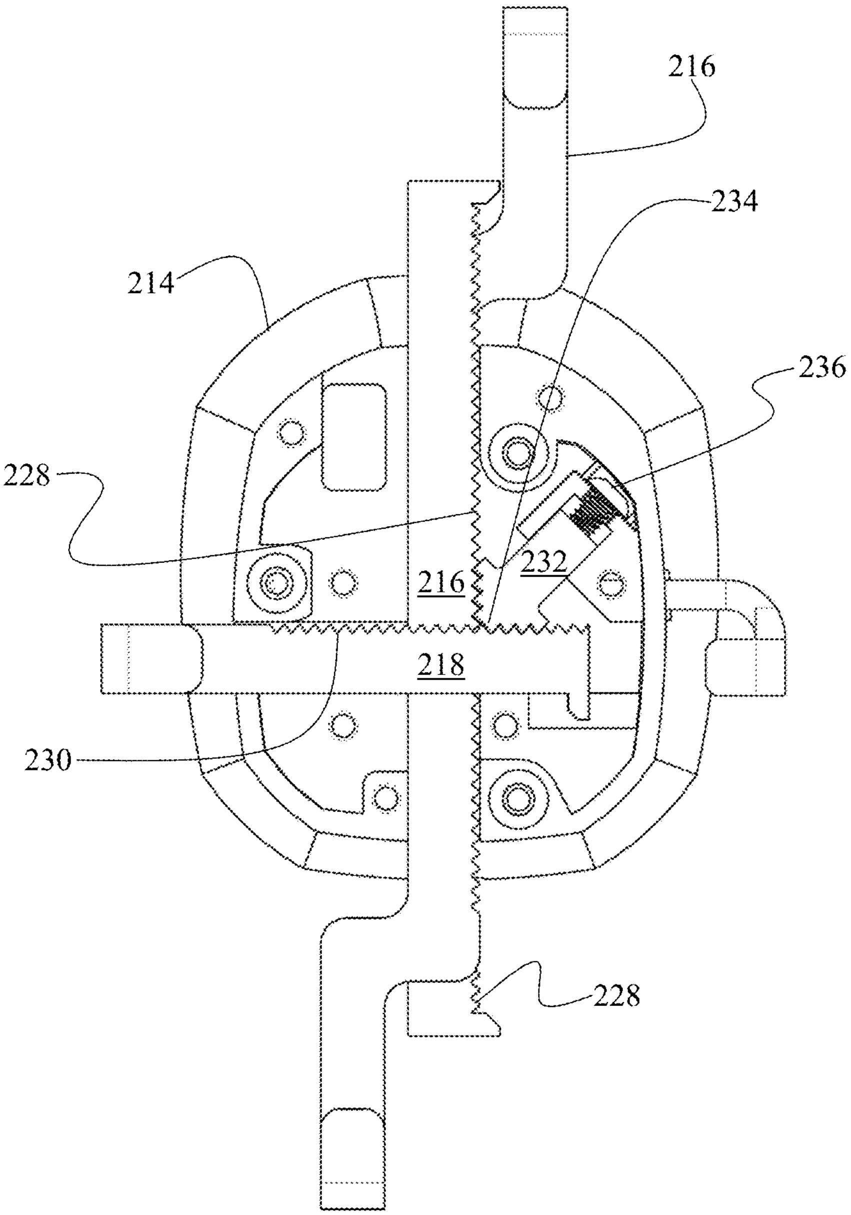
FIG. 15 a top view of a triple-stacked arm embodiment of the security device in a locked configuration.

FIG. 14 depicts that housing 214 has a first vertical track 224 and a second horizontal track 226. The vertical arms 216 are disposed within vertical track 224, while the horizontal arm 218 is disposed within horizontal track 226. The vertical arms 216 are stacked on top of one another within vertical track 224. The horizontal arm 218 is stacked on top of vertical arms 216, in an angular relation thereto. FIG. 14 depicts a perspective view, and FIG. 15 depicts a top view of this stacked arrangement. This arm arrangement is merely exemplary, and other ways of arranging arms 216 and 218, wherein arms 216 and 218 reside on different planes relative to the top surface of housing 214 fall within the scope of the invention.

FIG. 15 further depicts that arms 216 have teeth 228 disposed thereon, and arm 218 has teeth 230 disposed thereon. FIG. 15 depicts that teeth 228 of the vertical arms 216 point in the same direction such that they can be vertically aligned. FIG. 15 further depicts that the teeth 230 of the horizontal arm 218 and teeth 228 of the vertical arms 218 meet at an angle.

FIGS. 14 and 15 further depict a locking component 232 residing within housing 214. Locking component 232 has a set of teeth 234 disposed thereon. The shape of locking component 232 and the arrangement of teeth 234 are complementary to the angle formed at the intersection of vertical arms 216 and horizontal arm 218.

Figure 16:
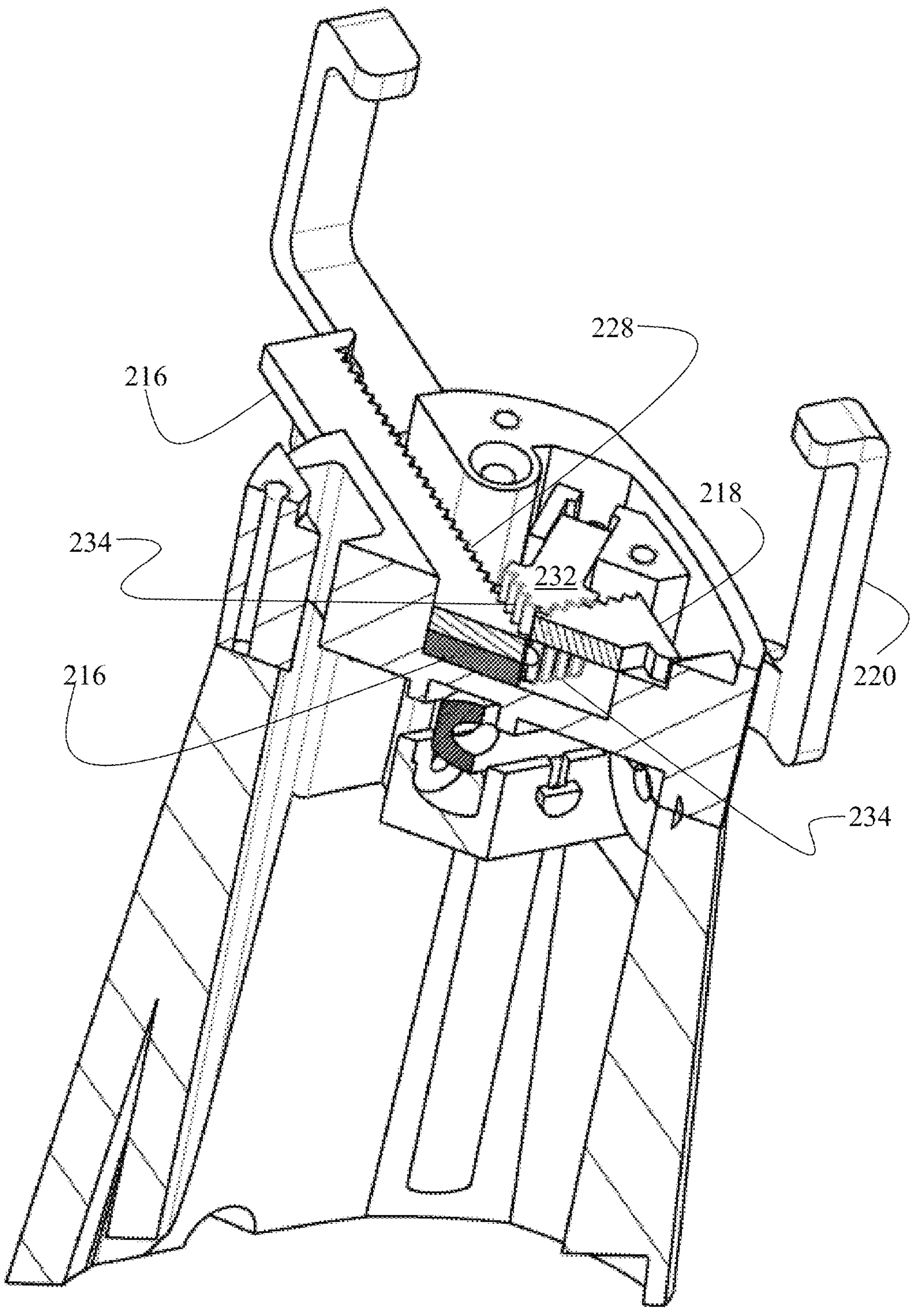
FIG. 16 is a perspective cross-sectional view depicting the locking component simultaneously engaging three stacked arms.

FIG. 16 provides a cross-sectional side view of security device 220 depicting that the thickness of locking component 232 is such that locking component 232 can simultaneously engage teeth 228 of both arms 216 and teeth 230 of arm 218. FIGS. 14-16 show that teeth 234 disposed on locking component 232 are configured to interlock with teeth 228 disposed on arms 216 and teeth 230 disposed on arm 218. When teeth 234 are interlocked with teeth 228 and 230, arms 216 and 218 are immobilized relative to housing 214, and the article of merchandise cannot be removed from grips 222.

FIG. 15 depicts an actuator 236. Actuator 236 is configured to transition locking component 232 between a locked configuration depicted in FIG. 15, in which teeth 234 are interlocked with teeth 228 and 230, and an unlocked configuration (not depicted in the figures), in which locking component 232 is retracted away from arms 216 and 218, and teeth 234 disengage teeth 228 and 230.

In an embodiment, actuator 236 can be in a screw-threaded engagement with locking component 232, such that rotation of actuator 236 causes locking component 232 to move linearly in a direction along a center axis of actuator 236. In alternative embodiments, other types of actuators 236 can be used, for example, a push button, a magnet switch, or an electromechanical actuator. A specialized key may be required to operate actuator 236. In some embodiments, the locking mechanism may involve a biasing element urging locking component 232 either toward its locked or unlocked configuration.

Security Bracket Having Coplanar Arms

Figure 17A:
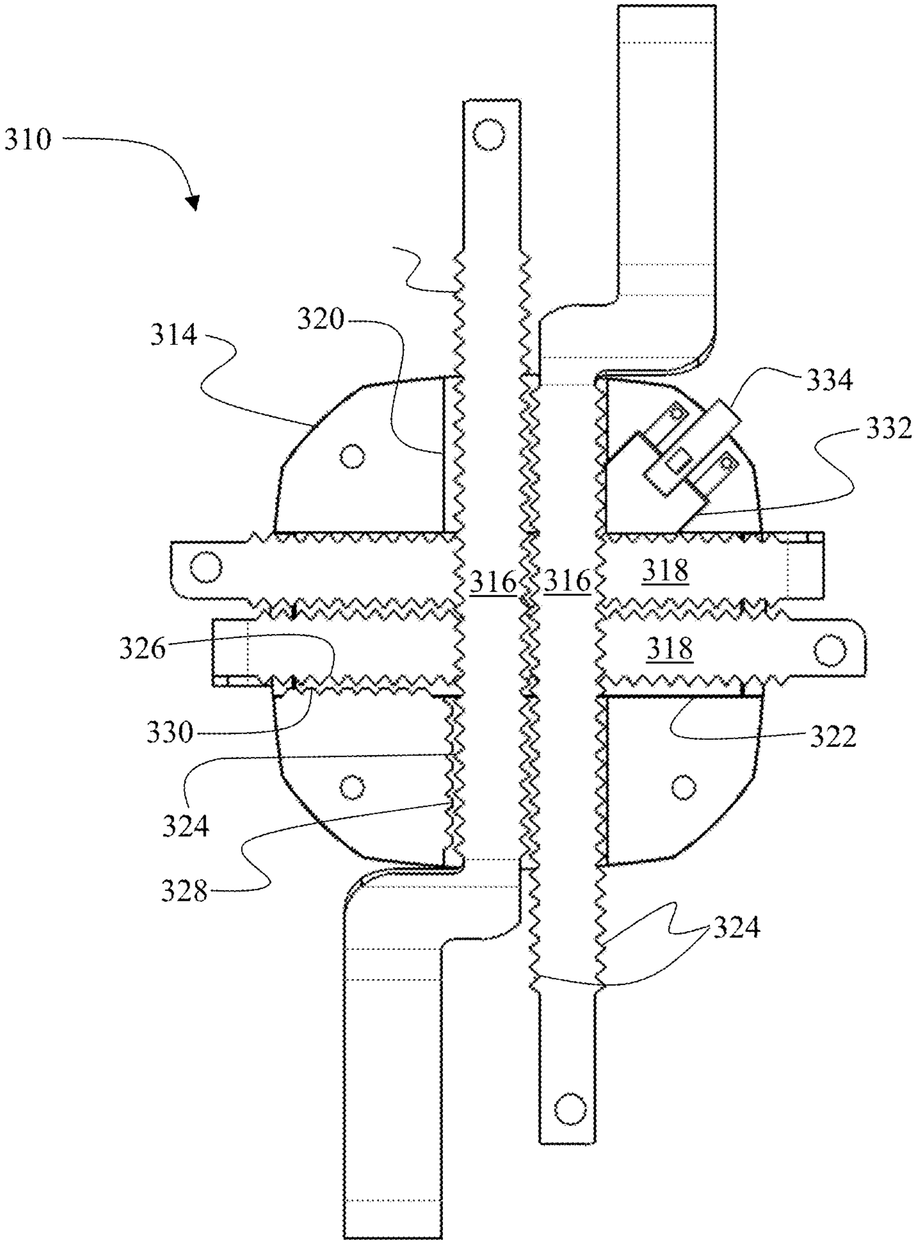
FIG. 17A is a top view depicting an unlocked configuration of an embodiment of the security device in which a set of locking teeth is disposed along a track within the housing.
Figure 17B:
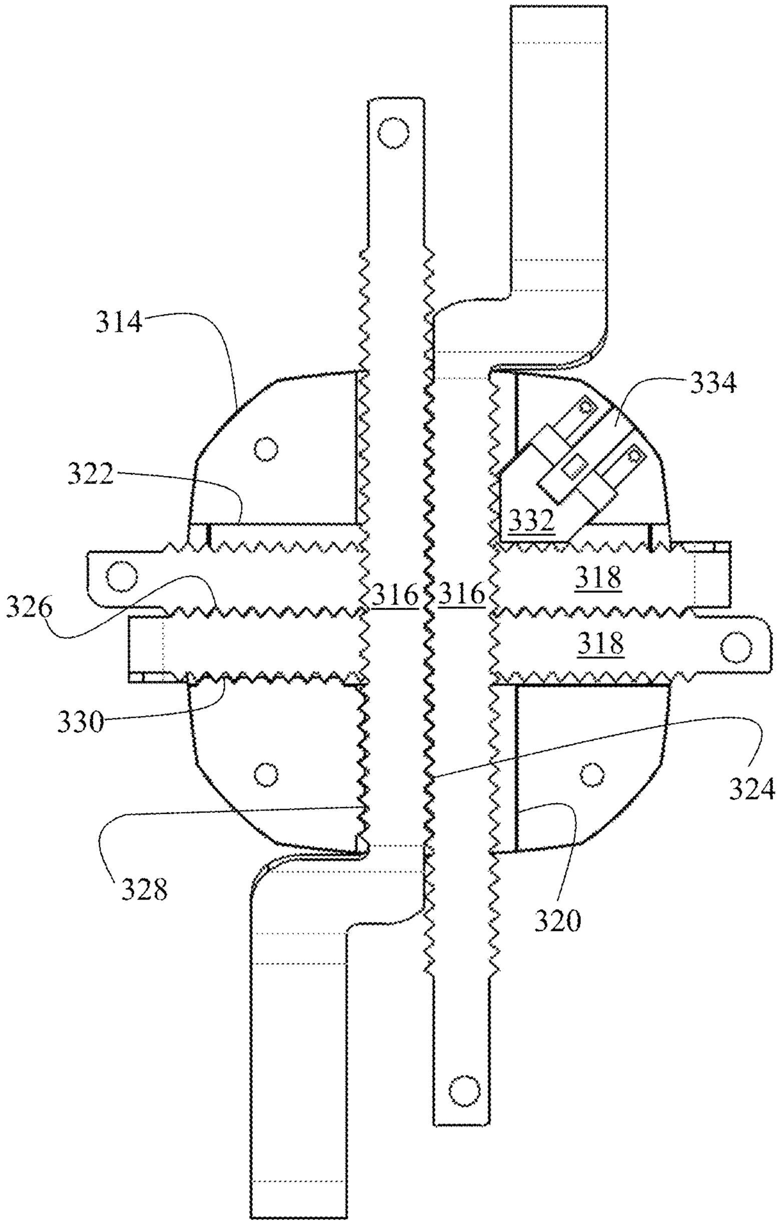
FIG. 17B is a top view depicting a locked configuration of an embodiment of the security device in which a set of locking teeth is disposed along a track within the housing.

FIGS. 17A-17B depict another embodiment of the invention. In this embodiment, security device 310 has a housing 314. A pair of vertical arms 316 and a pair of horizontal arms 318 are slidingly disposed within housing 314. Housing 314 has a vertical track 320 and a horizontal track 322. In this embodiment, the vertical track 320 and horizontal track 322 are configured to receive two arms in a side-by-side arrangement. As shown in FIGS. 17A-17B vertical arms 316 are coplanar relative to one another, and horizontal arms 318 are also coplanar with respect to one another. Vertical arms 316 are stacked on top of horizontal arms 318. This arrangement of vertical arms 316 and horizontal arms 318 is merely exemplary, and other arm arrangements involving at least to coplanar arms fall within the scope of the invention.

FIG. 17 depicts that vertical arms 316 have teeth 324 disposed thereon, while horizontal arms 318 have teeth 326 disposed thereon. Furthermore, teeth 328 are disposed along vertical track 320, and teeth 330 are disposed along horizontal track 322. Teeth 328 are complementary to teeth 324 and are configured to interlock therewith. Likewise, teeth 330 are complementary to teeth 326 and are configured to interlock therewith.

Security device 310 further includes a locking component 332. Analogously to the embodiment depicted in FIGS. 14-16, locking component 332 is structured such that it can simultaneously apply a force on at least one of vertical arms 316 and at least one of horizontal arms 318. Locking component 332 has an unlocked configuration depicted in FIG. 17A and a locked configuration depicted in FIG. 17B. In the unlocked configuration, locking component 324 is retracted away from arms 316 and 318. When locking component 324 is in this retracted position, vertical arms 316 and horizontal arms 318 can slide within their respective tracks 320 and 322.

FIG. 17B depicts the locked configuration of security device 310. In this locked configuration, locking component 332 applies a force onto a vertical arm 316 and a horizontal arm 318. This force presses the right vertical arm 316 into the left vertical arm 316, thereby interlocking their teeth 324. The force exerted by locking component 332 further presses left arm 316 into teeth 328 disposed along track 320, thereby causing teeth 324 of left arm 316 and teeth 328 of the track to interlock with one another. Analogously, the force exerted by locking component 332 on horizontal arms 318 presses the two coplanar arms 318 into one another, thus interlocking their teeth 326, and also presses arms 318 into teeth 330 disposed along track 322, thus interlocking teeth 326 and teeth 330. In this manner, locking component 332 immobilizes both vertical arms 316 and both horizontal arms 318 relative to housing 314.

FIG. 17B further depicts a retainer element 334, which engages locking component 332 and immobilizes locking component 332 against retracting into its unlocked configuration. In this embodiment, retainer element 334 comprises an upwardly biased tongue. In the unlocked configuration depicted in FIG. 17A, locking component 332 is positioned over retainer element 334, compressing its upwardly biased tongue. To lock security device 310, a tool or a push-button is used to move locking component 332 into its locked configuration depicted in FIG. 17B. When locking component 332 clears the upwardly biased tongue of retainer element 334, the tongue springs up behind locking component 332, thereby preventing locking component 332 from sliding back into its unlocked configuration.

To unlock security device 310, a user inserts a tool into housing 314 to downwardly compress the biased tongue of retainer element 334, thereby enabling locking component 332 to return to its unlocked configuration. In an embodiment, locking component 332 may be biased toward the unlocked configuration. Alternatively, a user can apply a transverse force or a moment onto arms 316 and/or arms 318 to move locking component 332 into its unlocked configuration.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:

- a housing having a top suffice configured to be proximal to the article of merchandise and a bottom surface opposite the top surface;
- a plurality of arms connected to the housing, wherein at least a first arm of the plurality of arms is in a sliding relationship relative to the housing, wherein a length of the first arm extending beyond the housing is adjustable by sliding the first arm inwardly or outwardly with respect to the housing;
- a grip disposed at an end of the first arm, the grip configured to receive a corner or an edge of the article of merchandise;
- a first set of teeth disposed along the first arm;
- a locking component slidingly disposed within the housing a non-rotational relationship thereto, wherein the locking component is transitionable between a first disengaged position and a second engaged position, wherein, in the second engaged position, the locking component exerts a force onto the first arm causing the first set of teeth disposed along the first arm to be interlocked with a second set of teeth, wherein the length of the first arm extending beyond the housing cannot be adjusted when the first and the second sets of teeth are interlocked; and
- a first mechanical element disposed within the housing, wherein the first mechanical element has a first configuration in which the first mechanical element is configured to immobilize the locking component in the second engaged position, and wherein the first mechanical element has a second configuration in which the first mechanical element releases the locking component, thereby enabling the locking component to retract into the first disengaged position, in which the locking component is retracted away from the first arm, thereby enabling, the first set of teeth to disengage the second set of teeth, thereby releasing the first arm to slide inwardly or outwardly with respect to the housing to adjust the length of the first arm extending beyond the housing.

2. The anti-theft device of claim 1, wherein a second arm of the plurality of arms is slidingly disposed relative to the housing, the second arm positioned below the first arm relative to the top surface of the housing.

3. The anti-theft device of claim 2, wherein, in the second engaged position, the locking component is configured to simultaneously engage the first arm and the second arm, thereby immobilizing the first arm and the second arm against movement relative to the housing.

4. The anti-theft device of claim 2, wherein a third arm of the plurality of arms is slidingly disposed relative to the housing, the third arm positioned below the first arm and the second arm relative to the top surface of the housing.

5. The anti-theft device of claim 4, wherein, in the second engaged position, the locking component is configured to simultaneously engage the first arm, the second arm, and the third arm, thereby immobilizing the first arm, the second arm, and the third arm against movement relative to the housing.

6. The anti-theft device of claim 1, wherein the second set of teeth is disposed on the locking component.

7. The anti-theft device of claim 1, wherein the first arm is configured to slide along a track disposed within the housing, and wherein the second set of teeth is disposed along the track.

8. The anti-theft device of claim 1, wherein a second arm of the plurality of arms is slidingly disposed relative to the housing, wherein the first arm and the second arm are coplanar relative to the top surface of the housing.

9. The anti-theft device of claim 8, wherein the second set of teeth is disposed along the second arm.

10. The anti-theft security device of claim 1, wherein at least one tooth of the first set of teeth has a sloped side, such that when the first set of teeth engages the second set of teeth, the first arm is configured to slide inwardly relative to the housing.

11. The anti-theft security device of claim 1, wherein the first mechanical element is an actuator screw-threadedly disposed within the housing, whereby rotation of the first mechanical element about a longitudinal center axis thereof transitions the first mechanical element between the first configuration and the second configuration thereof.

12. The anti-theft security device of claim 1, wherein the first mechanical element is biased toward the first configuration thereof.

13. A method of securing an article of merchandise within an anti-theft device, comprising:

- receiving the anti-theft device having a housing and a plurality of arms connected thereto, wherein at least a first arm of the plurality of arms is in a sliding relationship relative to the housing having a first extended position and a second retracted position;
- transitioning the first arm into the first extended position by sliding the first arm out of the housing;
- placing the article of merchandise onto a top surface of the housing;
- transitioning the first arm into the second retracted position by sliding the first arm into the housing until the first arm engages an edge or a corner of the article of merchandise; and
- operating an actuator disposed within the housing to immobilize the first arm in the second retracted position, wherein the article of merchandise cannot be removed from the anti-theft device while the first arm remains in the second retracted position;

wherein operation of the actuator causes a non-rotational locking component disposed within the housing to apply a force onto the first arm, wherein the force applied on the first arm by the non-rotational locking component causes a first set of teeth disposed along the first arm to interlock with a second set of teeth thereby immobilizing the first arm relative to the housing, wherein the first arm cannot be transitioned into the second extended position while the first set of teeth remains interlocked with the second set of teeth.

14. The method of claim 13, wherein a second arm of the plurality of arms is slidingly disposed relative to the housing, the second arm positioned below the first arm relative to the top surface of the housing.

15. The method of claim 14, wherein the locking component is configured to simultaneously apply the force onto the first arm and the second arm, thereby immobilizing the first arm and the second arm against movement relative to the housing.

16. The method of claim 14, wherein a third arm of the plurality of arms is slidingly disposed relative to the housing, the third arm positioned below the first arm and the second arm relative to the top surface of the housing.

17. The method of claim 16, wherein the locking component is configured to simultaneously apply the force onto the first arm, the second arm, and the third arm, thereby immobilizing the first arm, the second arm, and the third arm against movement to the housing.

18. The method of claim 13, wherein the second set of teeth is disposed on the locking component.

19. The method of claim 13, wherein the first arm is configured to slide along a track disposed within the housing, and wherein the second set of teeth is disposed along the track.

20. The method of claim 13, wherein a second arm of the plurality of arms is slidingly disposed relative to the housing, wherein the first arm and the second arm are coplanar relative to the top surface of the housing.

21. The method of claim 20, wherein the second set of teeth is disposed along the second arm.

* * * * *